US008988381B1

(12) United States Patent  (10) Patent No.: US 8,988,381 B1
Kim et al.  (45) Date of Patent: Mar. 24, 2015

(54) MOBILE TERMINAL AND METHOD FOR CONTROLLING THE SAME

(71) Applicant: LG Electronics Inc., Seoul (KR)

(72) Inventors: Jongho Kim, Seoul (KR); Jihwan Kim, Seoul (KR); Doyoung Lee, Seoul (KR); Eunhyung Cho, Seoul (KR); Sinae Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/245,904

(22) Filed: Apr. 4, 2014

(30) Foreign Application Priority Data

Feb. 14, 2014 (KR) ........................ 10-2014-0017290

(51) Int. Cl.
 *G06F 3/041* (2006.01)
 *G06F 1/16* (2006.01)

(52) U.S. Cl.
 CPC ............ *G06F 3/0412* (2013.01); *G06F 1/1652* (2013.01); *G06F 2200/161* (2013.01); *G06F 2203/04102* (2013.01)
 USPC ............ 345/173; 345/108; 345/156; 345/157

(58) Field of Classification Search
 None
 See application file for complete search history.

(56) References Cited

U.S. PATENT DOCUMENTS

| 2004/0008191 | A1* | 1/2004 | Poupyrev et al. | 345/184 |
| 2007/0247422 | A1* | 10/2007 | Vertegaal et al. | 345/156 |
| 2008/0303782 | A1* | 12/2008 | Grant et al. | 345/156 |
| 2010/0011291 | A1* | 1/2010 | Nurmi | 715/702 |
| 2010/0060548 | A1* | 3/2010 | Choi et al. | 345/1.3 |
| 2010/0117975 | A1* | 5/2010 | Cho | 345/173 |
| 2011/0095975 | A1* | 4/2011 | Hwang et al. | 345/156 |
| 2011/0227822 | A1* | 9/2011 | Shai | 345/156 |
| 2012/0188153 | A1* | 7/2012 | Tziortzis et al. | 345/156 |

FOREIGN PATENT DOCUMENTS

| KR | 10-2013-0112356 A | 10/2013 |
| KR | 10-2013-0113900 A | 10/2013 |
| KR | 10-2013-0125653 A | 11/2013 |
| KR | 10-2013-0135648 A | 12/2013 |

* cited by examiner

*Primary Examiner* — Jesus Hernandez
(74) *Attorney, Agent, or Firm* — Birch, Stewart, Kolasch & Birch, LLP

(57) ABSTRACT

A mobile terminal disclosed herein includes a terminal body that is configured to be deformable by an external force, a deformation sensor that is configured to sense a folded state and an unfolded state of the terminal body, a display unit that is mounted to the terminal body and configured to output screen information in the unfolded state, a touch sensor that is located on a folding edge area of the terminal body which is deformed upon conversion into the folded state, and configured to sense a user's touch input, and a controller that is configured to control the display unit to output divided screen information when the unfolded state is converted into the folded state after the touch input applied along the folding edge area is sensed in the folded state.

22 Claims, 27 Drawing Sheets

FIG. 2A
(a)
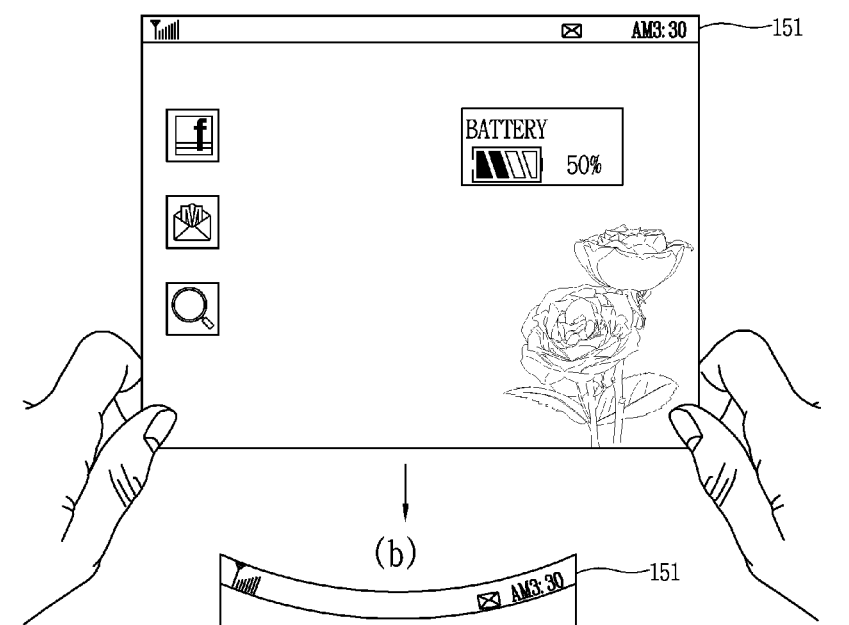
(b)
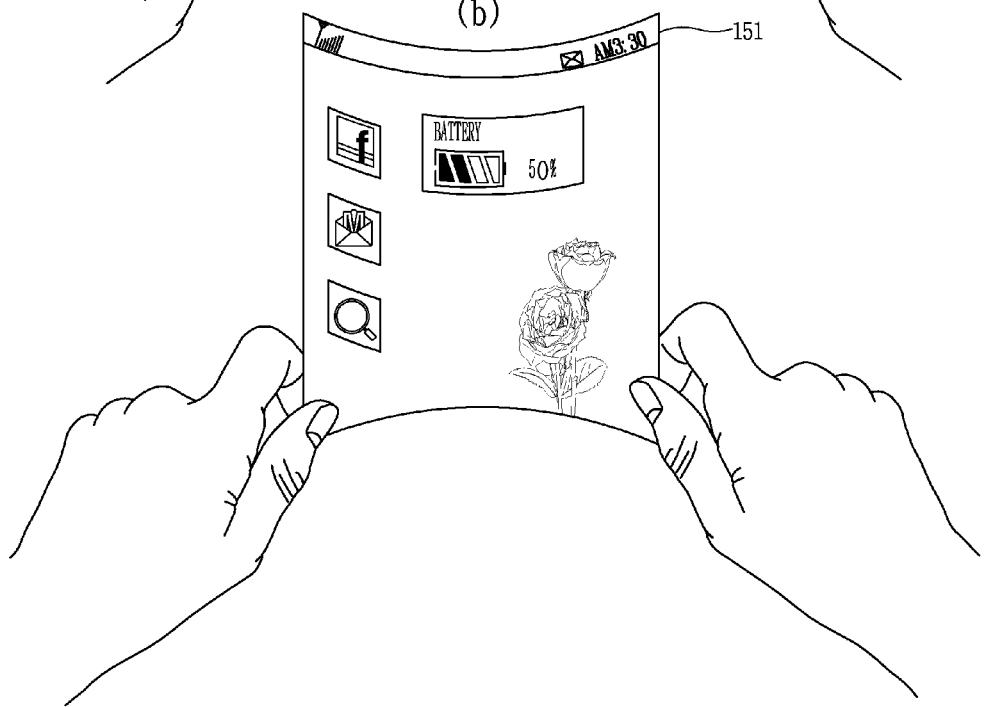

FIG. 2B
(a)
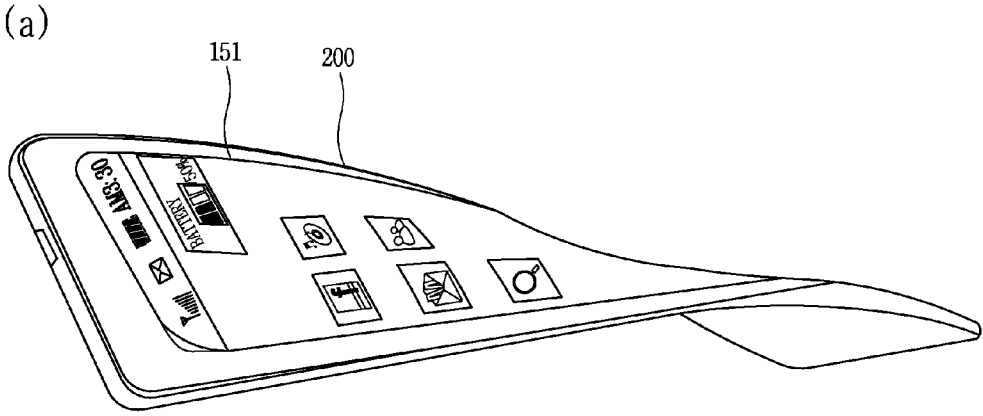
(b)
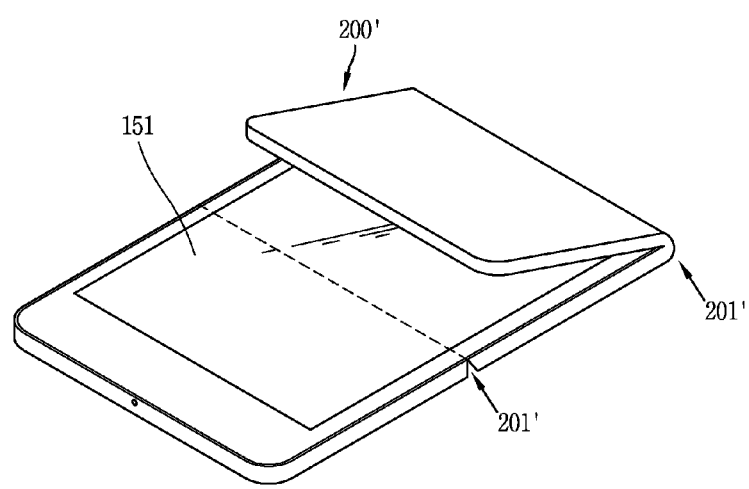

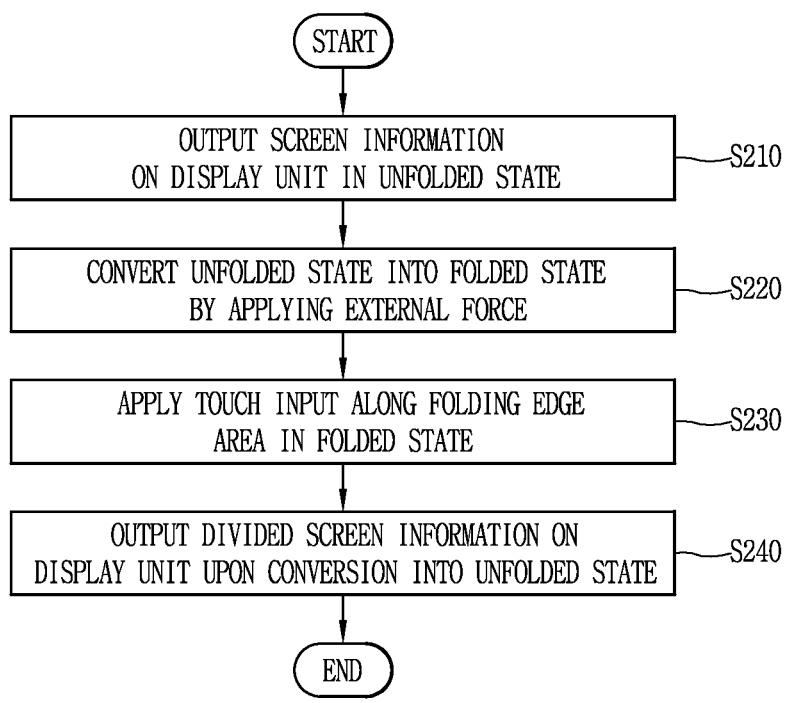

FIG. 4B
(a) 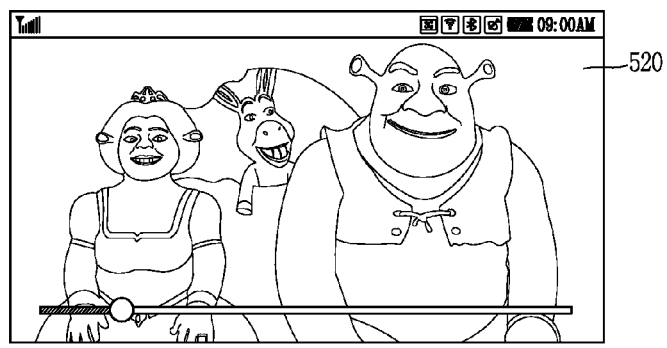
(b) 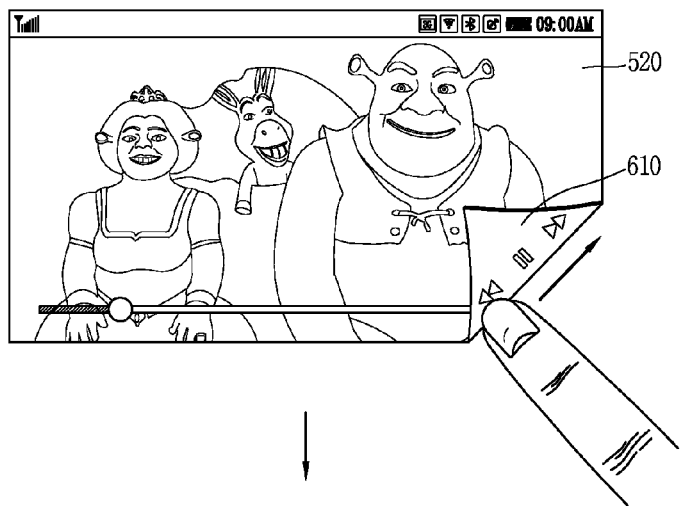
(c) 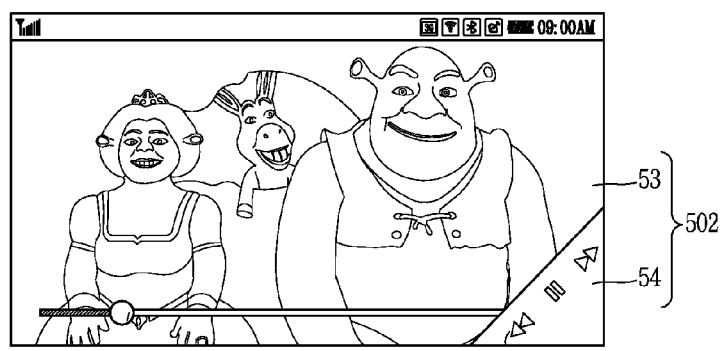

FIG. 4C
(a) 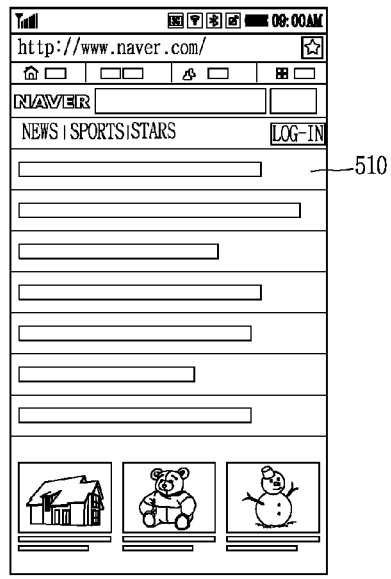
(b) 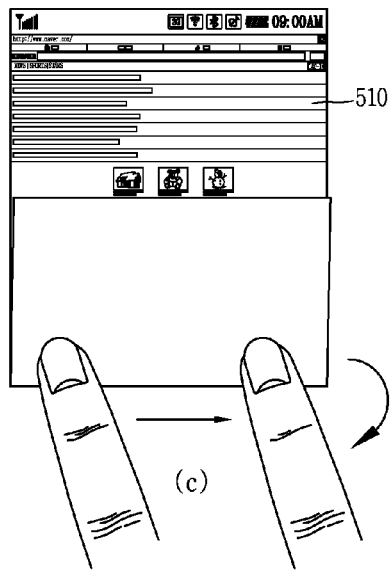
(c)
(d) 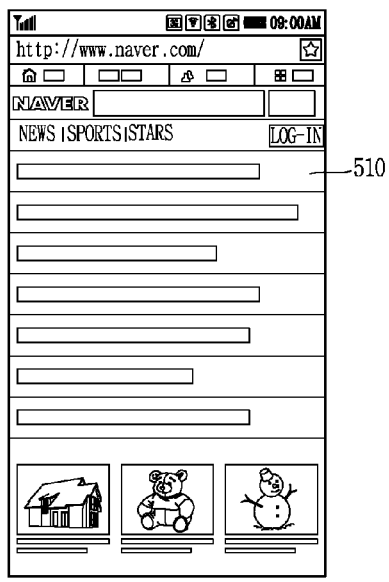
(c) 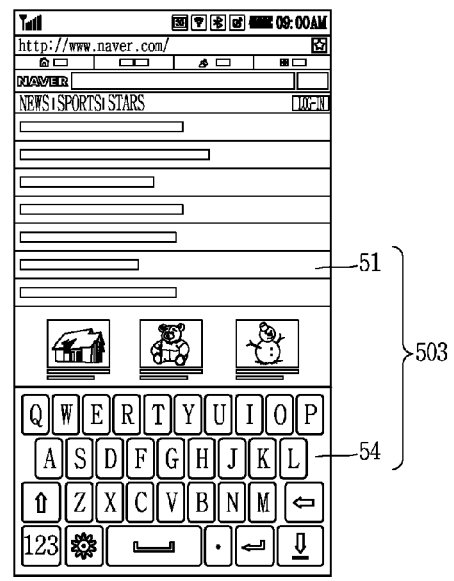

FIG. 5A
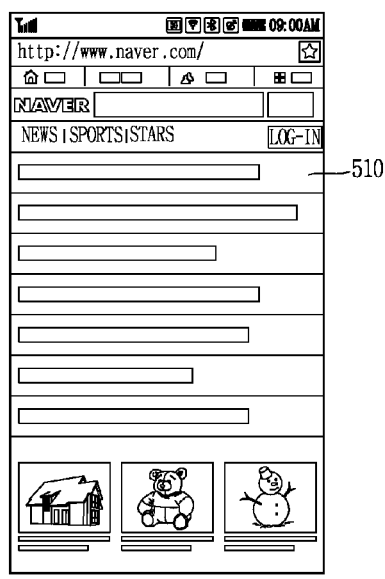
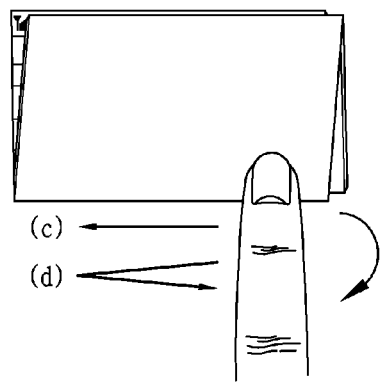
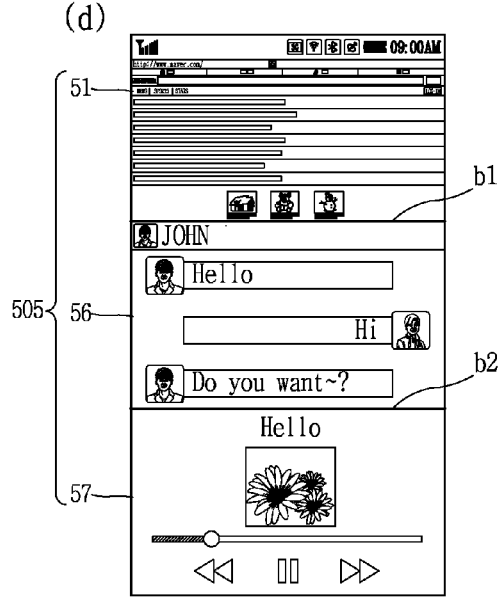
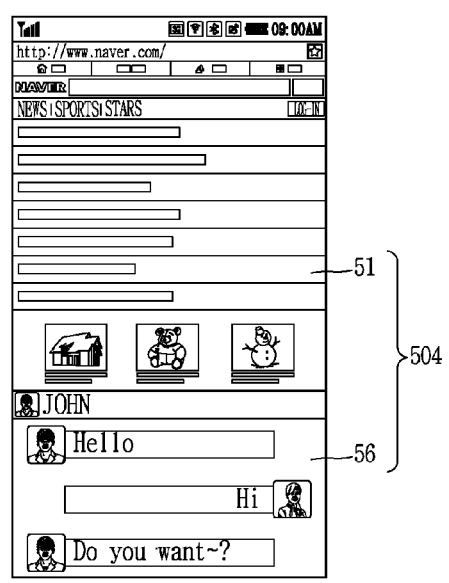

FIG. 5B
(a)
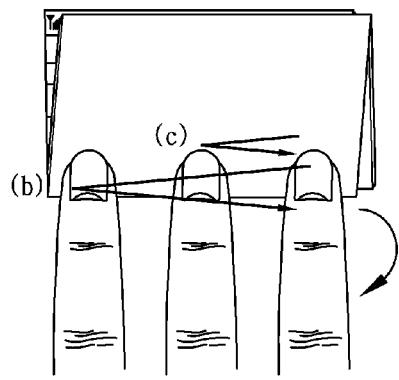
(b)
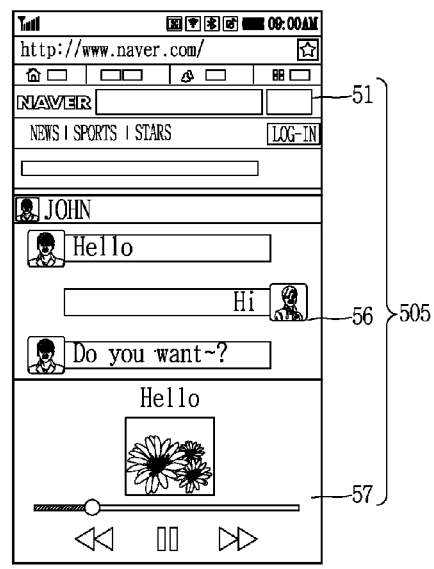
(c)
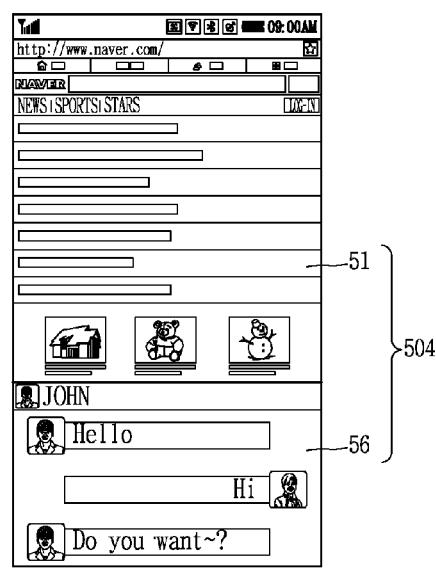

FIG. 5C
(a)
(b)
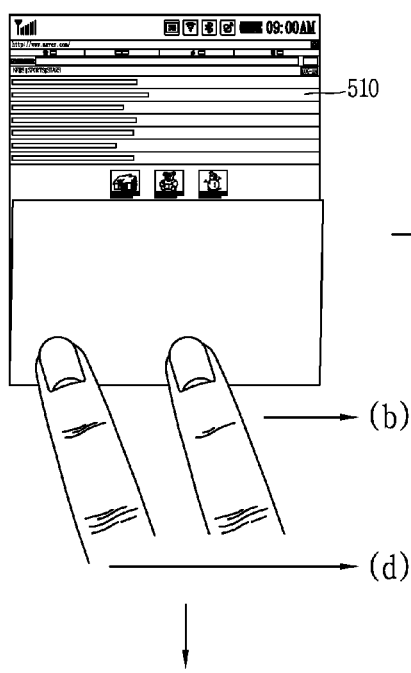
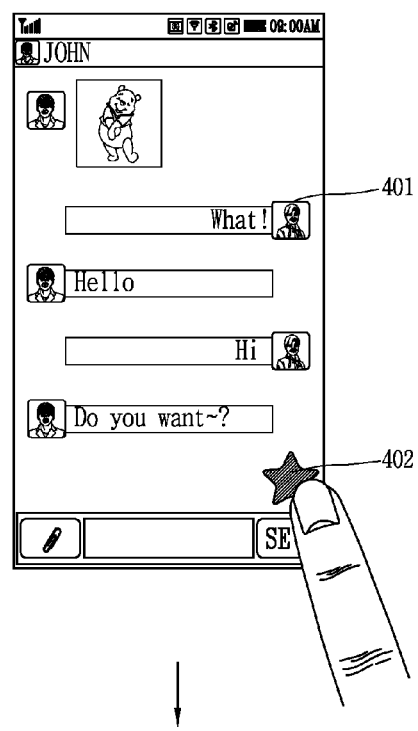
(d)
(c)
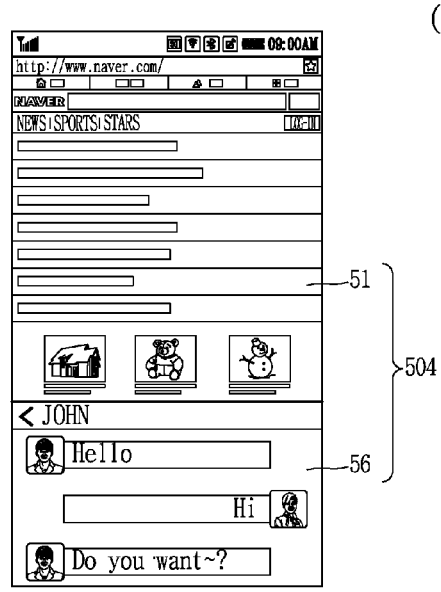
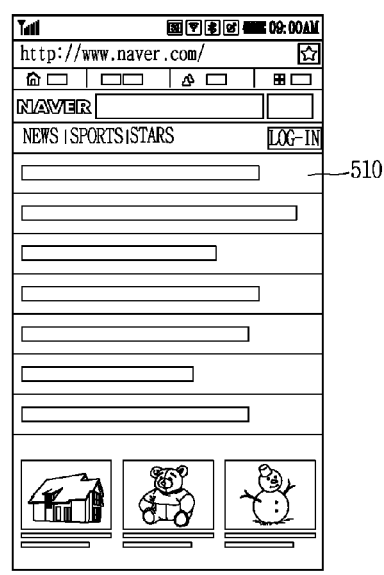

FIG. 6A
(a)
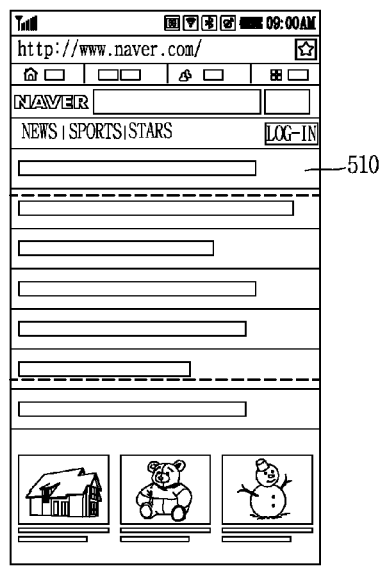
(b)
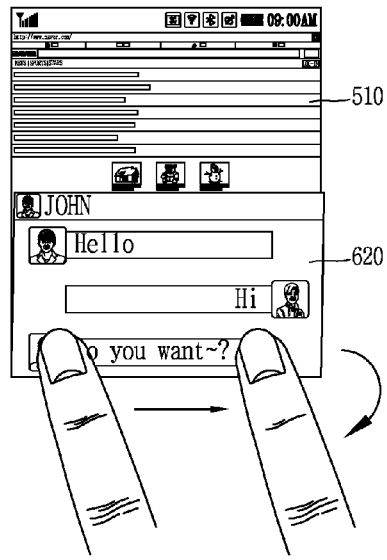
(c)
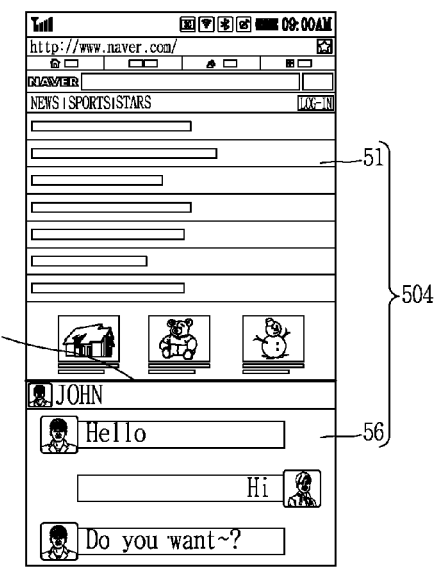

FIG. 7B
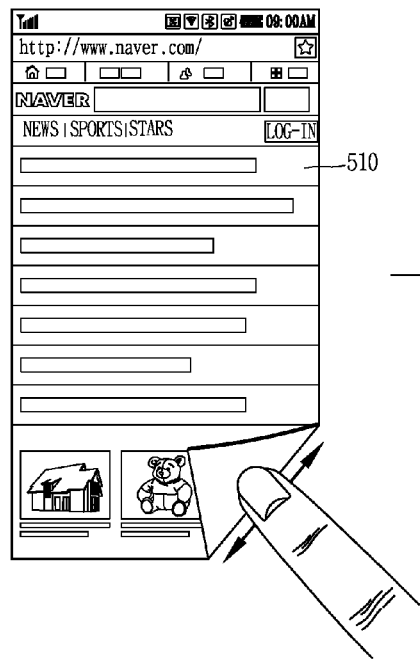
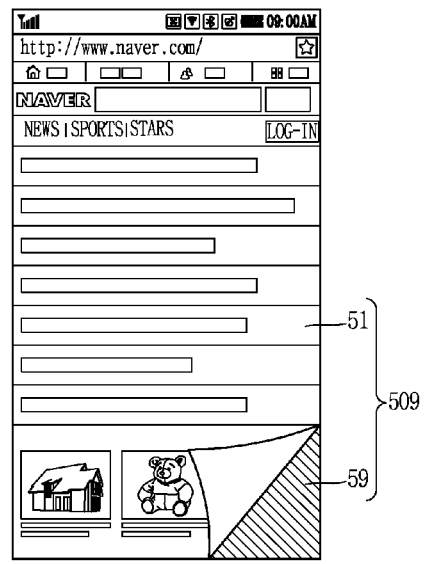
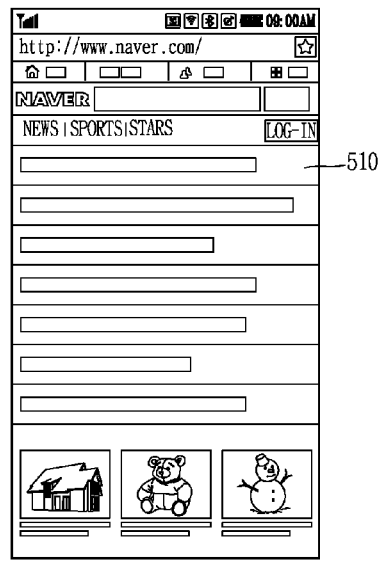
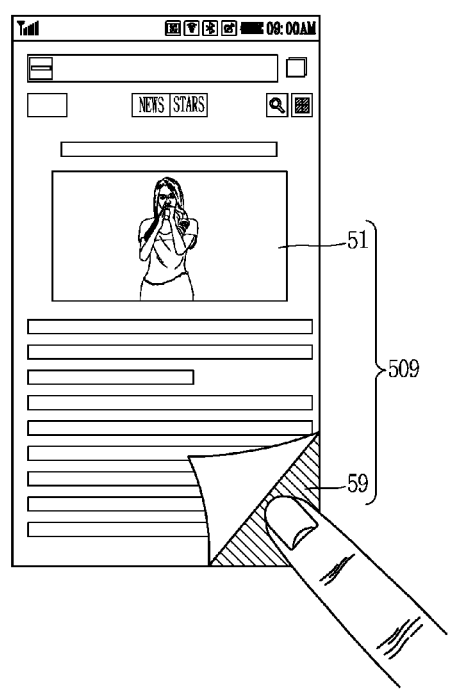

FIG. 8A
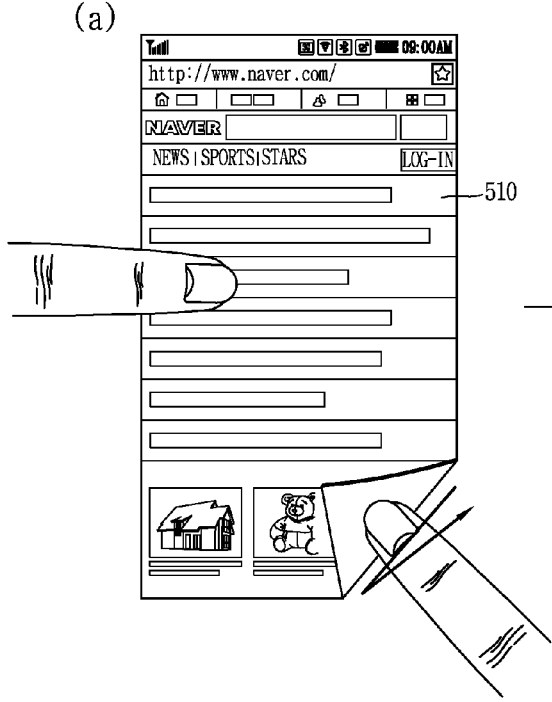
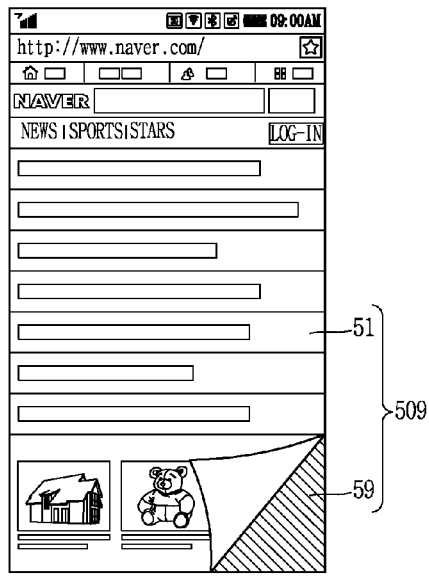
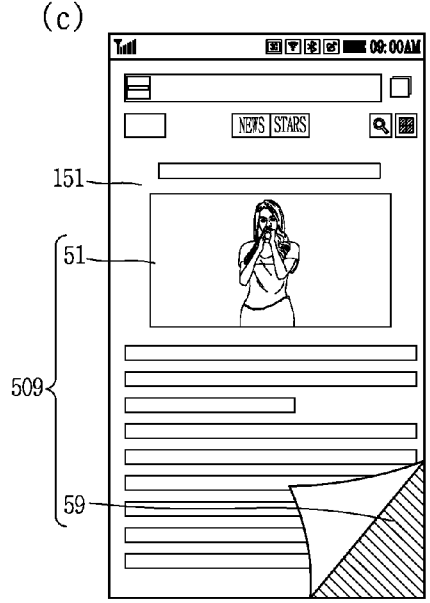
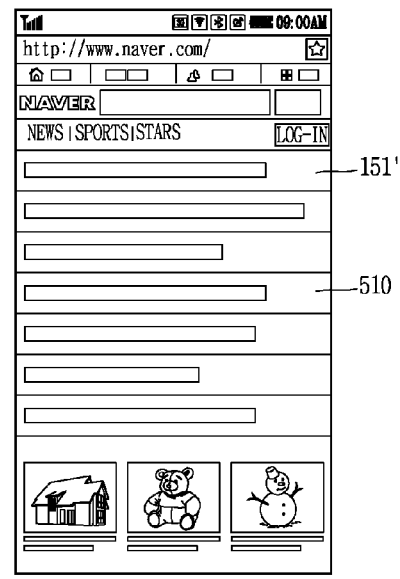

FIG. 10A
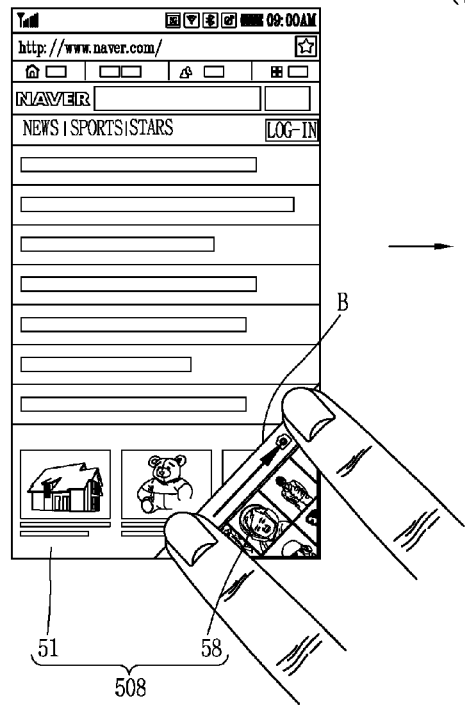
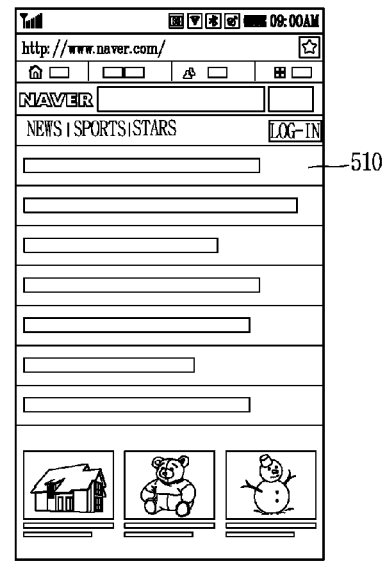

FIG. 10B
(a) 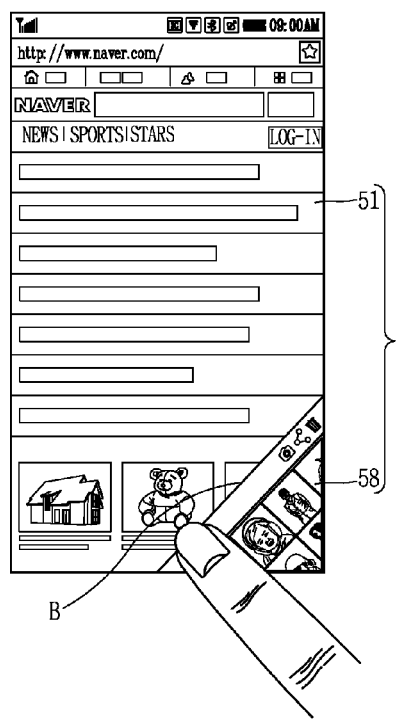
(b) 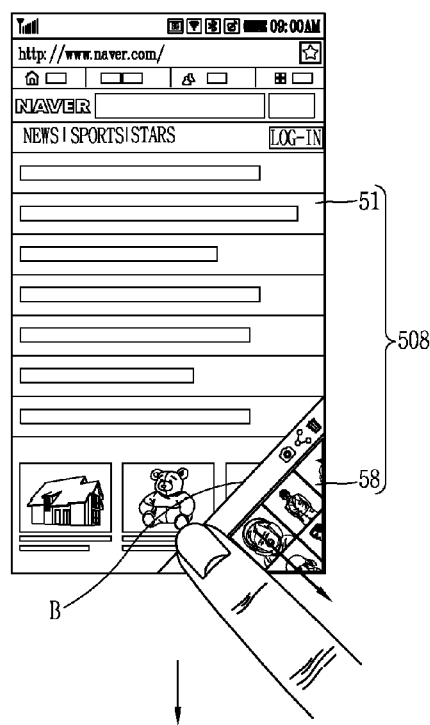
(c) 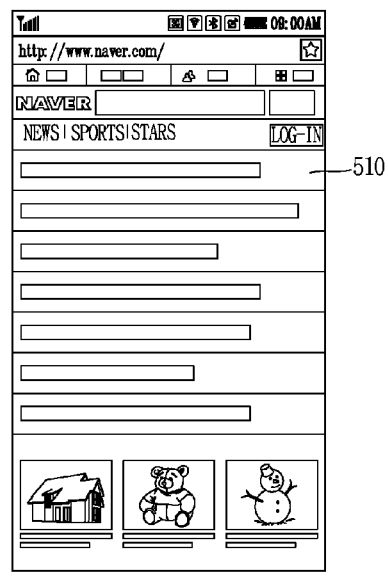

FIG. 10D
(a) 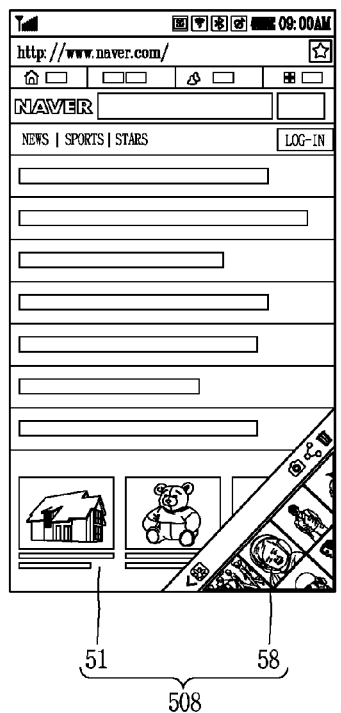
(b) 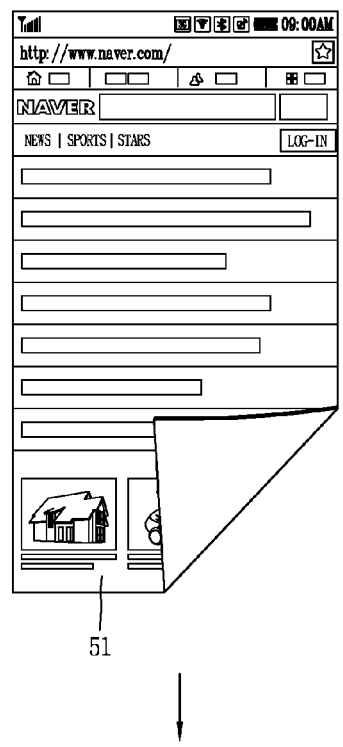
(c) 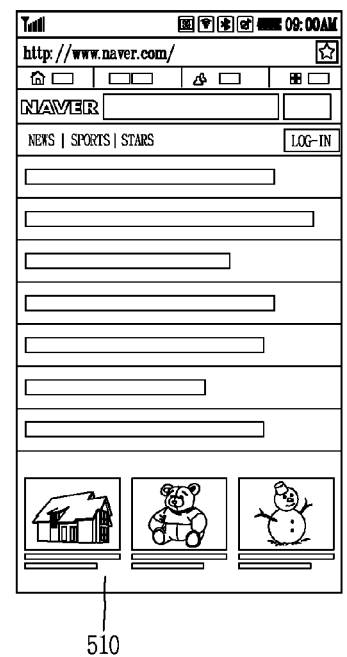

MOBILE TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Application No. 10-2014-0017290, filed Republic of Korea on Feb. 14, 2014, the contents of which is incorporated by reference herein in its entirety.

BACKGROUND OF THE DISCLOSURE

1. Field of the Disclosure

This specification relates to a mobile terminal having a display unit which is deformable by an external force.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Many efforts include not only changes and improvement of structural components implementing a mobile terminal but also software improvement to support and improve functions of the terminal.

Recently, for the sake of user convenience, mobile terminals which output screen information on a display unit 151 which is in a curved (or bent) or folded state have been developed. However, there may be a disadvantage in that the user has to randomly change the type and number of divided (segmented, split) screen information which is output on the display unit in the folded state.

SUMMARY OF THE DISCLOSURE

Therefore, an aspect of the detailed description is to provide a mobile to terminal capable of controlling divided screen information in response to a deformation of a display unit.

To achieve these and other advantages and in accordance with the purpose of this specification, as embodied and broadly described herein, there is provided a mobile terminal, including a terminal body that is configured to be deformable by an external force, a deformation sensor that is configured to sense a folded state and an unfolded state of the terminal body, a display unit that is mounted to the terminal body and configured to output screen information in the unfolded state, a touch sensor that is located on a folding edge area of the terminal body which is deformed upon conversion into the folded state, and configured to sense a user's touch input, and a controller that is configured to control the display unit to output divided screen information when the unfolded state is converted into the folded state after the touch input applied along the folding edge area is sensed in the folded state.

In accordance with one exemplary embodiment disclosed herein, the folding edge area may include a folded edge forming a part of an edge of the deformed terminal body in the folded state, and a surrounding area extending from the folding edge within a preset range.

In accordance with one exemplary embodiment disclosed herein, the divided screen information may include at least one of a content associated with the screen information, a content formed into a preset image, and a content corresponding to an execution screen of a specific application, and a basic content corresponding to the screen information.

In accordance with one exemplary embodiment disclosed herein, the divided screen information may include a boundary line dividing the first and to second contents from each other, and the boundary line may correspond to the folding edge area.

In accordance with one exemplary embodiment disclosed herein, the controller may form the boundary line on a different area of the display unit, in response to a touch range of a different touch input sensed by the touch sensor.

In accordance with one exemplary embodiment disclosed herein, the controller may decide a number of the contents included in the divided screen information, based on a length of a continuous touch input applied to the folding edge area.

In accordance with one exemplary embodiment disclosed herein, the deformation sensor may decide a number of the contents included in the divided screen information, based on a pressure degree of the touch input applied to the folding edge area.

In accordance with one exemplary embodiment disclosed herein, the controller may change an output area of a content, occupied on the divided screen information, in response to a touch input applied to the boundary line.

In accordance with one exemplary embodiment disclosed herein, the controller may control the display unit to convert the divided screen information into the first screen information, when the touch input is a continuous touch applied along an extending direction of the boundary line.

In accordance with one exemplary embodiment disclosed herein, after the unfolded state is converted into the folded state to define the folding edge area corresponding to the boundary line, when the conversion from the folded state back into the unfolded state is sensed by the deformation sensor, the controller may control the display unit to convert the divided screen information into the screen information.

In accordance with one exemplary embodiment disclosed herein, the terminal body may include first and second guide portions configured to guide the deformation of the terminal body, and the folding edge area may correspond to at least one of the first and second guide portions.

In accordance with one exemplary embodiment disclosed herein, in the folded state where one folding edge area corresponding to the first guide portion is formed, the controller may control the display unit to output the divided screen information, based on a length of a touch input applied to the folding edge area. Here, the divided screen information may include two individual contents or three individual contents based on the length.

In accordance with one exemplary embodiment disclosed herein, the terminal body may include a front surface having the display unit and a rear surface corresponding to the front surface. The terminal body may further include a rear display unit formed on the rear surface and configured to output visual information. One area of the rear display unit may be defined as the folding edge area in the folded state.

In accordance with one exemplary embodiment disclosed herein, a folding area of the rear display unit may be used to output a preset first image in the folded state. The controller may output the first image as a part of the divided screen information when the folded state is changed into the unfolded state after a touch input is applied to the folding edge area.

In accordance with one exemplary embodiment disclosed herein, when a second image including at least one icon corresponding to an application is output on a folding area of the rear display unit in the folded state, the controller may control the display unit to output an execution screen of the application as a part of the divided screen information, in response to a touch input which is initially applied to the icon and continuously applied to the folding edge area.

In accordance with one exemplary embodiment disclosed herein, the controller may decide a number of the content to be included in the divided screen information based on an additional touch input applied to the display unit while the touch input applied to the folding edge area is sensed.

In accordance with one exemplary embodiment disclosed herein, the controller may control a memory to store the screen information, in response to the additional touch input.

To achieve these and other advantages and in accordance with the purpose of this specification, as embodied and broadly described herein, there is provided a method for controlling a mobile terminal comprising a terminal body and a display unit both deformable by an external force, the method including outputting screen information on the display unit, sensing a folded state and an unfolded state of the terminal body, sensing a touch input applied along a folding edge area of the terminal body defined by the folded state when the folded state is sensed, and outputting divided screen information on the display unit in response to the touch input.

In accordance with one exemplary embodiment disclosed herein, the divided screen information may include a plurality of contents independent of each other. The terminal body may further include a guide portion configured to guide the terminal body to be deformed by the external force. A boundary line between the plurality of contents may correspond to the guide portion.

In accordance with one exemplary embodiment disclosed herein, the method may further include outputting the screen information, in response to a touch input applied to the boundary line between the plurality of contents configuring the divided screen information.

According to the present disclosure, a user can be provided with divided screen information based on a control command which is different from a control is command for simply deforming a mobile terminal. This may prevent the change in screen information when a display unit is deformed against the user's intent in a deformable mobile terminal.

Also, divided areas may be formed on the display unit to correspond to the folding edge area, which may allow the user to freely set the divided areas of the display unit.

Contents included in the divided screen information can be controlled based on touch inputs applied to the folding edge area and another area of a terminal body, resulting in enhancement of utilization of the display unit providing the divided screen information.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 2A is a conceptual view of an alternative embodiment of a mobile terminal disclosed herein;

FIG. 2B is a conceptual view of a flexible display unit included in a mobile terminal according to one exemplary embodiment disclosed herein;

FIG. 3 is a flowchart illustrating a control method of a mobile terminal in accordance with one exemplary embodiment disclosed herein;

FIGS. 4A to 4C are conceptual views illustrating the control method of FIG. 3;

FIGS. 5A to 5D are conceptual views illustrating a control method of a mobile terminal in response to a touch input applied to a touch sensor in accordance with various exemplary embodiments;

FIGS. 6A to 6C are conceptual views illustrating a control method of outputting divided screen information when a rear display unit is equipped;

FIGS. 7A and 7B are conceptual views illustrating a method of outputting divided screen information when a random area of a mobile terminal is deformed due to an external force;

FIGS. 8A to 8C are conceptual views illustrating a control method of outputting divided screen information in response to an additional touch input;

FIGS. 10A to 10E are conceptual views illustrating a control method of releasing a division of a display unit 151.

DETAILED DESCRIPTION OF THE DISCLOSURE

Figure 1:
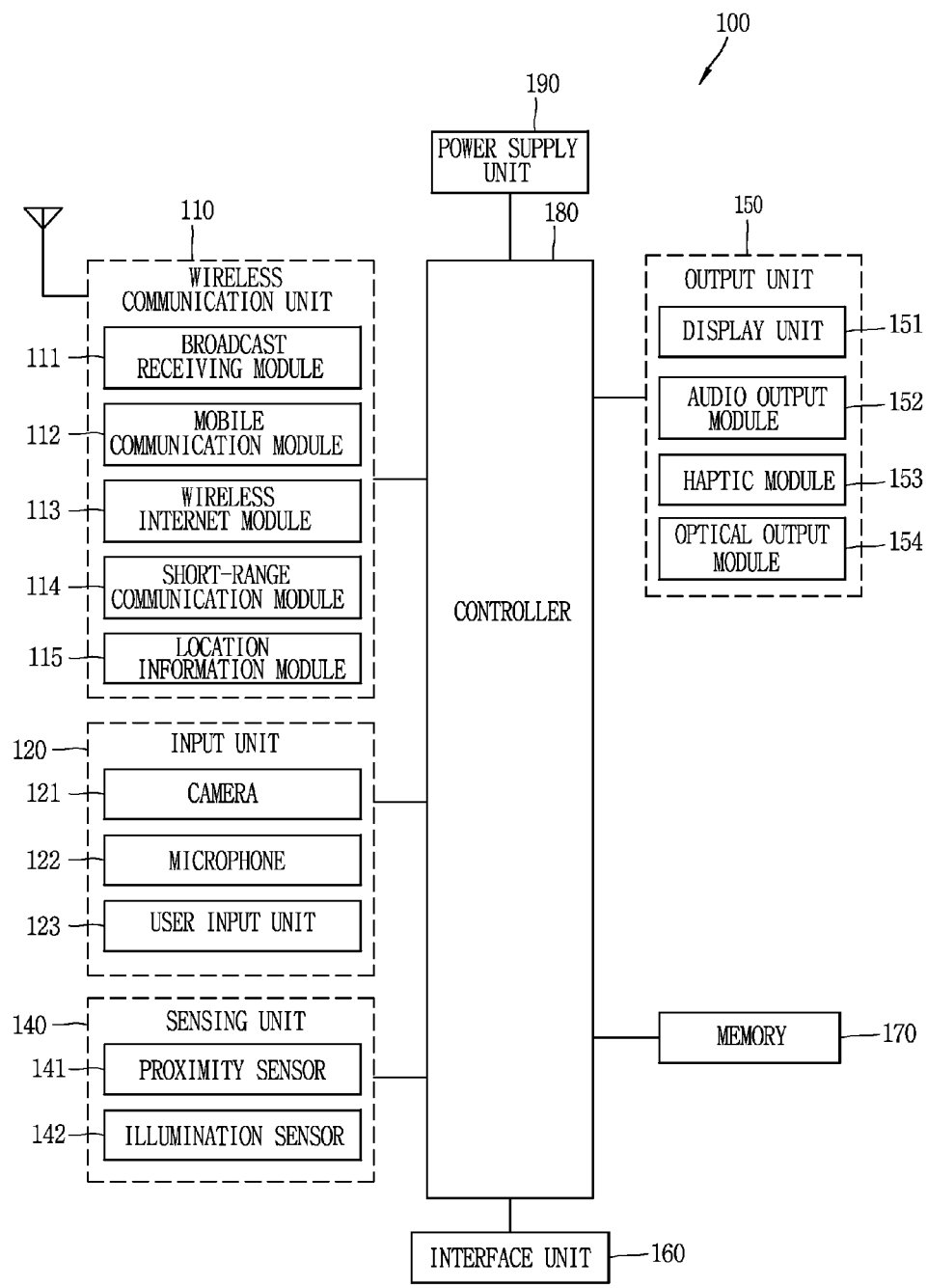
FIG. 1 is a block diagram of a mobile terminal in accordance with one exemplary embodiment disclosed herein.

Description will now be given in detail of the exemplary embodiments, with reference to the accompanying drawings. For the sake of brief description with reference to the drawings, the same or equivalent components will be provided with the same reference numbers, and description thereof will not be repeated. Hereinafter, suffixes "module" and "unit or portion" for components used herein in description are merely provided only for facilitation of preparing this specification, and thus they are not granted a specific meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it is represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, among those components, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to user commands.

The sensing unit 140 is typically implemented using one or more sensors configured to sense internal information of the mobile terminal, the surrounding environment of the mobile terminal, user information, and the like. For example, the sensing unit 140 is shown having a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, or activating application programs stored in the memory 170.

Also, the controller 180 may control some or all of the components illustrated in FIG. 1A according to the execution of an application program that have been stored in the memory 170. In addition, the controller 180 may combine two or more components included in the mobile terminal 100 for operation to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of those components may be combined for operation to implement an operation, a control or a control method of the mobile terminal is according to various embodiments disclosed herein. Also, the operation, the control or the control method of the mobile terminal may be implemented on the mobile terminal by activating at least one application program stored in the memory 170.

Hereinafter, prior to describing various exemplary embodiments implemented by the mobile terminal 100, each of the aforementioned components will be described in more detail with reference to FIG. 1A.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE, and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like.

The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile is terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), and the camera sensor may include at least one of a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

Meanwhile, the present disclosure may display information processed in the mobile terminal on a flexible display. Hereinafter, this will be described in more detail with reference to the accompanying drawings.

FIG. 2A is a conceptual view of a mobile terminal 200 according to an alternative embodiment disclosed herein.

As illustrated in FIG. 2A, a mobile terminal 200 is shown having display unit, which is a type of display that is deformable by an external force. This deformation, which includes display unit and other components of mobile terminal 200, may include any of curving, bending, folding, twisting, rolling, and combinations thereof. The deformable display unit may also be referred to as a "flexible display unit." In some implementations, the flexible display unit may include a general flexible display, electronic paper (also known as e-paper), and combinations thereof.

The flexible display unit of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

In a state that the flexible display unit is not deformed (for example, in a state with an infinite radius of curvature and referred to as a first state), a display area of the flexible display unit includes a generally flat surface. In a state that the flexible display unit is deformed from the first state by an external force (for example, a state with a finite radius of curvature and referred to as a second state), the display area may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit may be a curved state (for example, a state of being curved from up to down or from right to left), instead of being in a flat state. In this embodiment, when an external force is applied to the flexible display unit, the flexible display unit may transition to the second state such that the flexible display unit is deformed into the flat state (or a less curved state) or into a more curved state.

If desired, the flexible display unit may implement a flexible touch screen using a touch sensor in combination with the display. When a touch is received at the flexible touch screen, the controller 180 (see FIG. 1A) can execute certain control corresponding to the touch input. In general, the flexible touch screen is configured to sense touch and other input while in both the first and second states.

One option is to configure the mobile terminal 200 to include a deformation sensor which senses the deforming of the flexible display unit. The deformation sensor may be included in the sensing unit 140 (see FIG. 1A).

The deformation sensor may be located in the flexible display unit or the case 201 to sense information related to the deforming of the flexible display unit. Examples of such information related to the deforming of the flexible display unit may be a deformed direction, a deformed degree, a deformed position, a deformed amount of time, an acceleration that the deformed flexible display unit is restored, and the like. Other possibilities include most any type of information which can be sensed in response to the curving of the flexible display unit.

In some embodiments, the controller 180 or other component can change information displayed on the flexible display unit, or generate a control signal for controlling a function of the mobile terminal 200, based on the information related to the deforming of the flexible display unit.

The mobile terminal 200 according to the alternative embodiment is shown having a case 201 for accommodating the flexible display unit. The case 201 can be deformable together with the flexible display unit, taking into account the characteristics of the flexible display unit.

A battery (not shown in this figure) located in the mobile terminal 200 may also be deformable in cooperation with the flexible display unit 261, taking into is account the characteristic of the flexible display unit. One technique to implement such a battery is to use a stack and folding method of stacking and folding battery cells.

FIG. 2B is a conceptual view of a flexible display unit 151 included in a mobile terminal according to one exemplary embodiment disclosed herein.

As illustrated in (a) and (b) of FIG. 2B, a flexible display unit 151 may include a display which is curved, bent, folded or rolled by a physical force applied to an external force. Here, the flexible display unit 151 may include both a general flexible display and an e-paper.

Here, the general flexible display is formed as a lightweight, non-fragile display, which still exhibits characteristics of a conventional flat panel display, but is instead fabricated on a flexible substrate which can be deformed as noted previously.

The e-paper may be used to refer to a display technology employing the characteristic of a general ink, and is different from the conventional flat panel display in view of using reflected light. The e-paper is generally understood as changing pictures or letters using a twist ball or via electrophoresis using a capsule.

Meanwhile, the sensing unit 140 (see FIG. 1) for sensing bending information may be provided on the flexible display unit. The term 'bending' disclosed herein may include all the meanings of 'curving,' 'rolling,' 'folding,' and the like.

The sensing unit 140 may be disposed on the overall flexible display unit 151 or on a part of the flexible display unit 151, and sense the bending information related to the flexible display unit 151. Here, the bending information related to the flexible display unit 151 may include a bent direction, a bent degree, a bent position, a bent time, an acceleration that the bent flexible display unit returns to its original state, and the like. The bending information may also be various information, which can be sensed in response to the bending of the flexible display unit 151.

Also, the controller 180 may change information displayed on the flexible display unit 151 or generate a control signal for controlling a function of the mobile terminal 100, based on the bending information related to the flexible display unit 151, sensed by the sensing unit 140.

For example, when the flexible display unit 151 is bent by an external physical force, as illustrated in (a) and (b) of FIG. 2A, the controller 180 may rearrange, separate or combine screen images, which have been displayed on the flexible display unit, or change curves of those screen images, based on the bent direction, the bent angle, and the return acceleration to its original state of the flexible display unit.

As one example, referring to (a) and (b) of FIG. 2A, when the flexible display unit 151 is bent inwardly by an external physical force, a screen image output on the flexible display unit 151 may be displayed to be close to each other. On the other hand, when the flexible display unit 151 is bent outwardly by an external physical force, the screen image output on the flexible display unit 151 may be displayed to be apart from each other.

Besides the aforementioned methods, the controller 180 may control the method of displaying information on the flexible display unit 151 in various manners such that a user can correctly recognize the information displayed on the flexible display unit 151.

The mobile terminal including the flexible display unit 151, as illustrated in (a) of FIG. 2B, may also include a case 200 which surrounds the flexible display unit 151. The case 200 may be formed to be bent together with the flexible display unit 151 by an external physical force, taking into account the characteristic of the flexible display unit 151.

As aforementioned, the controller 180 may generate a control signal associated with the function of the mobile terminal, in response to the bending information related to the flexible display unit 151.

The mobile terminal according to this exemplary embodiment may be configured in such a manner that one area of the flexible display unit 151 is foldable by a user's force. Here, the term "folding" refers to a state that the display unit 151 has areas facing each other in response to a partial area thereof being bent.

Meanwhile, (b) of FIG. 2B is a conceptual view of a foldable mobile terminal that a preset area of a terminal body is deformed by an external force in a folding manner. The mobile terminal may include a guide portion 201' extending on the preset area in one direction. The guide portion 201' may be formed in a manner that an area with the guide portion 201' is deformable by a user. As illustrated in the figure, the mobile terminal may be configured to be foldable along the guide portion 201', and the guide portion 201' may be formed in plurality according to a type of mobile terminal.

The display unit 151 may also be foldable based on the deformation along the guide portion 201'.

The mobile terminal according to the present disclosure may include a front display unit (hereinafter, referred to as a display unit 151 for the sake of is explanation) and a rear display unit formed on front and rear surfaces of the terminal body, respectively.

When a user's touch input is applied in a folded state of the display unit 151, the mobile terminal may be controlled such that the display unit 151 is divided into several areas. Hereinafter, a detailed control method of outputting divided screen information based on a deformation of the display unit 151 will be described.

Figure 4A:
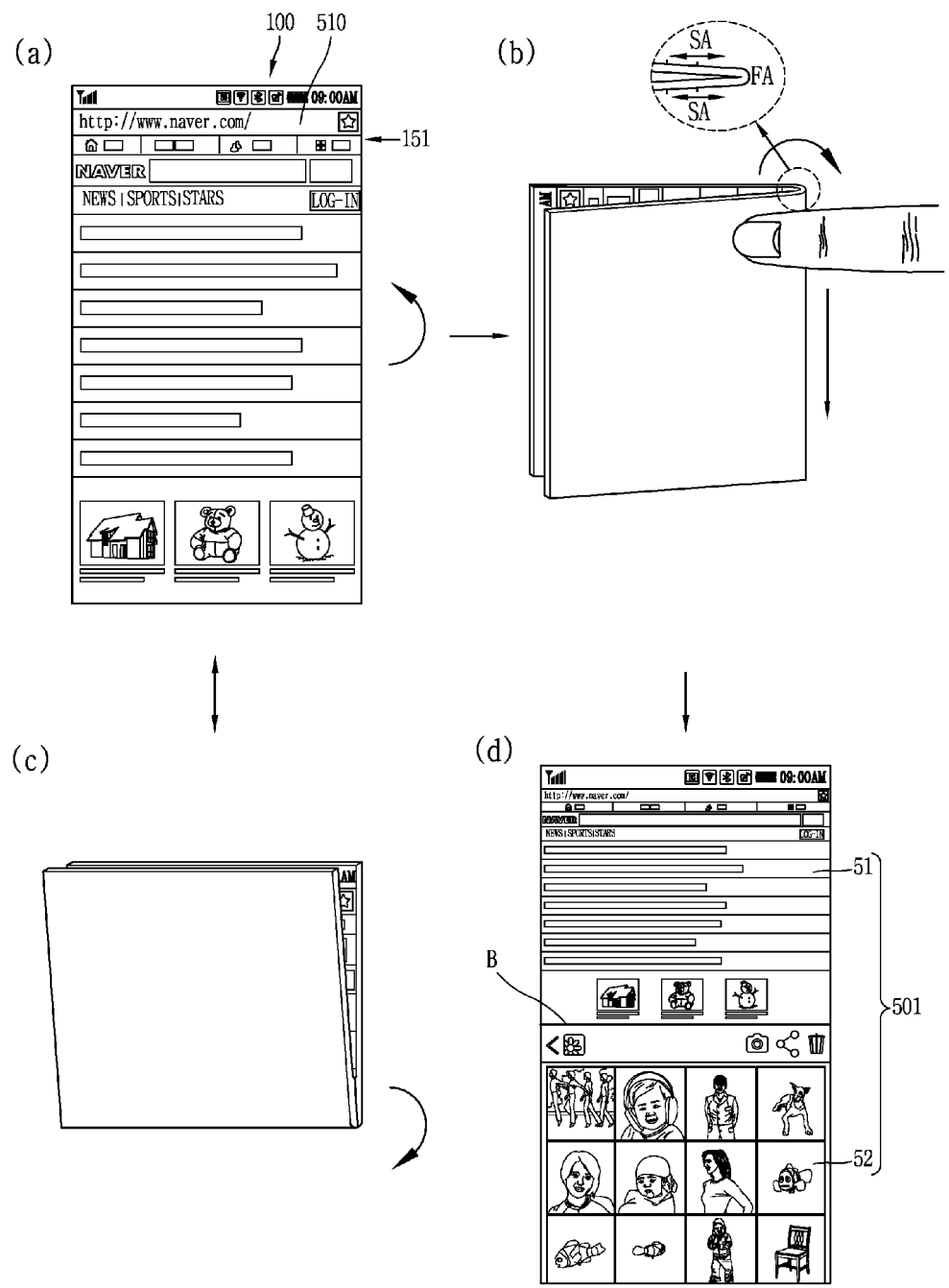

FIG. 3 is a flowchart illustrating a control method of a mobile terminal in accordance with one exemplary embodiment disclosed herein, and FIGS. 4A to 4C are conceptual views illustrating the control method of FIG. 3.

A case where the display unit 151 is bent by an external force applied by a user and has areas facing each other is defined as a folded state. Also, a state which is not the folded state, namely, a state that the display unit 151 (and the terminal body) is(are) not folded and a case where the display unit 151 does not have areas facing each other are all defined as an unfolded state.

The display unit 151 may output first screen information 510 in the unfolded state (S210). There may not be any limit to the first screen information 510. For example, the first screen information may correspond to an execution screen of a specific application, a reproduction screen of a media file, a home screen page including an icon for receiving a touch input for executing an application, and the like. (a) of FIG. 4A illustrates the display unit 151 which outputs a webpage as the first screen information 510.

The unfolded state may be changed into the folded state by an external force (S220). An exemplary embodiment of FIG. 4A illustrates that the mobile terminal includes the display unit 151 formed on the front surface of the terminal body and does not have the rear display unit, and the terminal body is deformable such that areas of the display unit 151 can face each other. However, the present disclosure may not be limited to this. The mobile terminal may also be implemented into a folded state in which the display unit 151 is externally exposed.

Referring to (c) of FIG. 4A, when the folded state is changed into the unfolded state, the controller 180 may control the display unit 151 to output the first screen information 510. That is, according to this embodiment, the controller 180 may not generate a control command to convert the first screen information 510 in response to the change of the folded state and the unfolded state.

On the other hand, in the folded state, the mobile terminal may receive a touch input applied along a folding edge area (S230). The mobile terminal may further include a touch sensor (or a touch sensing unit) formed on the folding edge area. Referring to (b) of FIG. 4A, in the folded state, the folding edge area may include a folding area FA, and a surrounding area SA.

The folding area FA may correspond to an area where the body of the mobile terminal in a flat state is bent into a curved line (form) by an external force. The surrounding area SA may denote one area of the terminal body which extends from the folding area FA toward a preset area. That is, an externally-exposed area of the folding area FA may form one edge of the terminal body in the folded state. The folding area FA and the surrounding area SA may include the terminal body and the display unit 151.

That is, the touch sensor may be formed on at least one of the folding area FA and the surrounding area SA. The touch sensor may be formed on at least one area of the rear surface of the terminal body. However, when an entire area of the terminal body is formed to be deformable, the touch sensor may preferably be formed on the entire area of the rear surface.

Also, if the rear display unit is formed on the rear surface according to another exemplary embodiment, the rear display unit may further include a touch sensor.

Meanwhile, when it is sensed that one area of the terminal body and one area of the display unit 151 are deformed, the controller 180 may control the touch sensor to sense a user's touch input. Accordingly, the controller 180 may differently recognize other control commands applied to the touch sensor in the unfolded state and the user's touch input applied to the touch sensor in the folded state.

A touch input applied along the folding edge may correspond to a touch input applied to at least one area of the folding area FA and the surrounding area SA, and there may not be a limit to a touch input manner. For instance, the touch input may correspond to a continuous touch input which is applied along a direction that the folding area FA is formed, a continuous touch input which is initially applied to the folding area FA and moves toward the surrounding area SA, a touch input applied for a preset time, a touch input applied in a flicking or tapping manner, and the like.

Referring to (d) of FIG. 4A, when the change of the folded state into the unfolded state is carried out after sensing the touch input, the controller 180 may control the display unit 151 to output divided screen information, namely, first divided screen information 501 (S240).

The first divided screen information 501 may include a first content 51 and a second content 52. That is, the first divided screen information 501 may include the first and second contents 51 and 52 which are independently output on two divided areas of the display unit 151.

A boundary line B may define the display unit 151 into divided areas for outputting the first and second contents 51 and 52. The controller 180 may form the boundary line B to correspond to the folding edge area. In detail, the boundary line B may preferably be formed to correspond to the folding area FA. Referring to the drawing, when the touch input is applied after the terminal body is deformed by the external force such that a central area of the display unit 151 is folded, the boundary line B may be formed along the central area of the display unit 151.

That is, the controller 180 may sense a deformed area of the terminal body in the folded state, and form the boundary line B based on the touch input.

The first and second contents 51 and 52 may include different visual data or substantially the same visual data. The first and second contents 51 and 52 may correspond to an execution screen of a specific application, an image, a reproduction screen of a media file, a home screen page including an icon receiving a touch input for executing an application, and a part of specific screen information.

For example, the first content 51 may include substantially the same visual information as the first screen information 510. That is, the first content 51 may correspond to a webpage, and as illustrated, the webpage may be output to the divided area at a changed output ratio. The output method, however, may not be limited to this. The controller 180 may control the display unit 151 to output only a part of the first screen information 510 to the divided area.

The second content 52 may include visual information which is different from the first content 51. For example, the second content 52 may correspond to an execution screen of a gallery application.

The first and second contents 51 and 52 may be individually controlled based on a user's control command. That is, applications corresponding to the first and second contents 51 and 52 may be independently controlled. For instance, the second content 52 may not be controlled by a touch input applied to one area of the display unit 151, on which the first content 51 is output.

The second content 52 may correspond to, but not limited to, visual information preset by a user or a producer of the mobile terminal. For example, the second content 52 may correspond to an execution screen of an application, which is relating to the first screen information 510, decided in the touch input manner, or currently executed on the mobile terminal.

That is, when a user's touch input is applied to the folding edge area in the folded state, the controller 180 may control the display unit 151 to output the divided screen information on the divided areas. Accordingly, the user may be provided with the divided screen information based on a control command, which is different from a control command for simply deforming the mobile terminal.

Consequently, in the deformable mobile terminal, when the display unit is deformed against the user's intent, the change of the screen information can be prevented.

Also, the divided areas can be formed on the display unit 151 to correspond to the folding edge area, so that the user can be free to set the divided areas of the display unit 151.

Hereinafter, a control method of outputting divided screen information according to various exemplary embodiments will be described.

First, description will be given of a control method of outputting divided screen information when an image is output on a rear display unit, with reference to FIG. 4B. A mobile terminal according to this exemplary embodiment may include a rear display unit formed on another surface, which faces one surface of a terminal body having the display unit 151. The rear display unit may output visual information, independent of the display unit 151.

Referring to (a) of FIG. 4B, the display unit 151 may output second screen information 520. For example, the second screen information 520 may correspond to a reproduction screen of a media file.

When the mobile terminal is changed into the folded state by an external force, the controller 180 may control the rear display unit to output a first image 610, which is associated with the second screen information 520, on a folding area of the rear display unit, which is disposed to overlap the display unit 151 in the folded state. That is, the first image 610 may be output on the folding area in the same direction as the output direction of the screen information of the display unit 151. For example, the first image 610 may include a plurality of icons receiving touch inputs for controlling a reproduction of the media file.

After a touch input applied to the folding edge area is sensed in the folded state, when the folded state is changed into the unfolded state, the controller 180 may control the display unit 151 to output second divided screen information 502. The second divided screen information 502 may include a third content 53 corresponding to one area of the second screen information 520, and a fourth content 54 formed substantially the same as the first image 610.

That is, visual information which was output on the rear display unit may be output on the divided screen information of the display unit 151. One of the divided areas of the display unit 151 may be formed to correspond to one area of the rear display unit (or the rear surface of the terminal body) in the folded state.

According to this exemplary embodiment, the user can be continuously provided in the unfolded state with information, which is provided on the rear display unit in the folded state.

Hereinafter, description will be given of a control method of outputting contents associated with screen information on divided screen information, with reference to FIG. 4C. In the unfolded state where the first screen information 510 is output on the display unit 151, the controller 180 may sense the change (conversion) into the folded state where one area of the display unit 151 is deformed.

In the folded state, the first screen information 510 may be output on one area of the display unit 151, which does not overlap one area of the mobile terminal, but the present disclosure may not be limited to this. A part of the first screen information 510 may also be output on the one area of the display unit 151.

After a touch input is applied to the folding edge area in the folded state, when the folded state is converted into the unfolded state, the controller 180 may control the display unit 151 to output third divided screen information 503. The third divided screen information 503 may include the first content 51 which includes substantially the same visual information as the first screen information 510, and a fourth content 54 associated with the first screen information 510.

Here, the fourth content 54 associated with the first screen information 510 may include a graphic image for controlling an application corresponding to the first screen information 510. Or, the fourth content 54 may correspond to another information tagged to the first screen information 510, a captured image of the first screen information 510, an execution screen of a specific application, which is cooperative with an application of the first screen information 510, or the like. Referring to (c) of FIG. 4C, the fourth content 54 may include a virtual keyboard receiving a touch input for inputting a text to the first content 51, which is substantially the same as the first screen information 510.

Accordingly, the controller 180 may control the display unit 151 to output the first content 51 together with the text, in response to the touch input applied to the fourth content 54.

Referring to (b) and (d) of FIG. 4C, when the folded state is converted into the unfolded state without any touch input being sensed on the folding edge area in the folded state, the controller 180 may control the display unit 151 to output the first screen information 510 as it is.

In such a manner, the user can be facilitated to obtain visual information associated with the screen information, which is output on the display unit 151, without a separate control command.

FIGS. 5A to 5D are conceptual views illustrating a control method of a mobile terminal, in response to a touch input applied to a touch sensing unit, in accordance with various exemplary embodiments.

(a) of FIG. 5A illustrates a display unit 151 of a mobile terminal outputting the first screen information 510. (b) of FIG. 5A illustrates the folded state of the mobile terminal which is deformed in such a manner that three random areas of the mobile terminal overlap one another. In this case, one area of the mobile terminal which is bent (deformed) to form an edge in the folded state may be defined as a folding edge area. According to this exemplary embodiment, the folding edge area may be formed in plurality. Referring to (b) of FIG. 5A, the mobile terminal may include two folding edge areas which face each other in the folded state.

Referring to (b) and (c) of FIG. 5A, when a touch input applied along one direction of the folding edge area is sensed, the controller 180 may output fourth divided screen information 504 including two divided areas. The fourth divided screen information 504 may include the first content 51 and a sixth content 56. For example, the first and sixth contents 51 and 56 may correspond to, but not limited to, execution screens of different applications. The sixth content 56 may also correspond to an execution screen of a message application.

The fourth divided screen information 504 may include a boundary line B which divides output areas for the first and sixth contents 51 and 56. The controller 180 may form the boundary line B to correspond to one of the folding edge areas, to which the touch input is applied.

On the other hand, referring to (b) and (d) of FIG. 5A, the controller 180 may control the display unit 151 to output fifth divided screen information 505, which includes three divided areas, in response to a continuous touch input applied in a manner of going and returning along the folding edge area.

The fifth divided screen information 505 may include the first content 51, the sixth content 56 and a seventh content 57. The fifth divided screen information 505 may include first and second boundary lines b1 and b2, and the boundary lines b1 and b2 may be formed to correspond to the two folding edge areas, respectively.

That is, the controller 180 may control the display unit 151 to output different divided screen information based on different types of touch inputs applied to the folding edge areas. The different divided screen information may include a different number of contents. That is, the controller 180 may control the display unit 151 to have different divided areas according to touch types applied to the folding edge areas.

This may allow the user to decide the number of areas to be divided, by varying a touch input manner in the folded state of the mobile terminal.

Hereinafter, description will be given of a control method of outputting divided screen information based on a touch range applied to the folding edge area, with reference to FIG. 5B. As illustrated in (a) and (b) of FIG. 5B, when a touch input applied by a first length along the folding edge area is sensed, the controller 180 may control the display unit 151 to output the fifth divided screen information 505 including the first content 51, the sixth content 56, and the seventh content 57. That is, the controller 180 may control the display unit 151 to include three divided areas.

Meanwhile, the deformation sensor may sense a pressure degree related to a touch input applied to the folding edge area. The controller 180 may decide a number of the divided areas, namely, a number of the contents, based on the pressure degree of the touch input. For instance, when the deformation sensor senses a first pressure of the touch input, as illustrated in (c) of FIG. 5C, the controller 180 may control the display unit 151 to output the fourth divided screen information 504. When a second pressure greater than the first pressure is sensed with respect to the touch input, as illustrated in (b) of FIG. 5B, the controller 180 may control the display unit 151 to output the fifth divided screen information 505.

That is, the user may select divided screen information to output by adjusting the touch input applied in the folded state.

On the other hand, referring to (a) and (c) of FIG. 5B, when a touch input applied by a second length is sensed in the folded state, the controller 180 may control the display unit 151 to output the fourth divided screen information 504. Here, the first and second lengths may be different from each other, and the first length may be set, but not limited, to be shorter than the second length.

That is, the controller 180 may adjust the number of divided areas of the display unit 151 according to a range of a continuous touch input applied by a user.

Hereinafter, a control method of storing screen information in a folded state will be described with reference to FIG. 5C. As illustrated in (a) and (b) of FIG. 5C, the display unit 151 may output first screen information 510, and the controller 180 may control the memory 170 to store the first screen information 510, in response to a first touch input applied onto the folding edge area in the folded state. Here, the first touch input may correspond to a continuous touch input applied as long as a third length.

The controller 180 may control the display unit 151 to output a graphic image 402 which is provided to receive a touch input for outputting the first screen information 510 again. The graphic image 402 may be output on, but not limited to, one area which is covered with the rear surface of the mobile terminal in the folded state.

Even when the first screen information 510 is converted into another visual data 401 by a user's control command, the controller 180 may control the display unit 151 to continuously output the graphic image 402.

On the other hand, referring to (a) and (d) of FIG. 5C, the controller 180 may control the display unit 151 to output the fourth divided screen information 504, in response to a second touch input which is applied to the folding edge area in the folded state. The second touch input may correspond to a continuous touch input applied by the third length which is different from the second length.

That is, the controller 180 may activate a different function based on a different touch input applied to the folding edge area. That is, the user may apply a different touch input onto the folding edge area in the folded state so as to store the currently-output screen information or obtain divided screen information including visual information which is different from the currently-output screen information.

Hereinafter, a control method of providing a captured content of screen information, in response to a touch input will be described, with reference to FIG. 5D.

The display unit 151 may output the first screen information 510 in the unfolded state. When a preset type of touch input is applied to the folding edge area in the folded state, the controller 180 may control the memory 170 to store the first screen information 510 in a capturing manner.

The controller 180 may control the display unit 151 to output sixth divided screen information 506, which includes the first content 51 and a captured image 51', based on the folding edge area. The first content 51 and the captured image 51' may include substantially similar information. Here, the first content 51 may be controlled based on a user's control command, but the captured image 51' may not be deformed based on the user's control command.

Here, the preset type of touch input may correspond to a continuous touch input applied by the palm of the hand, but the touch type may not be limited.

Figure 5D:
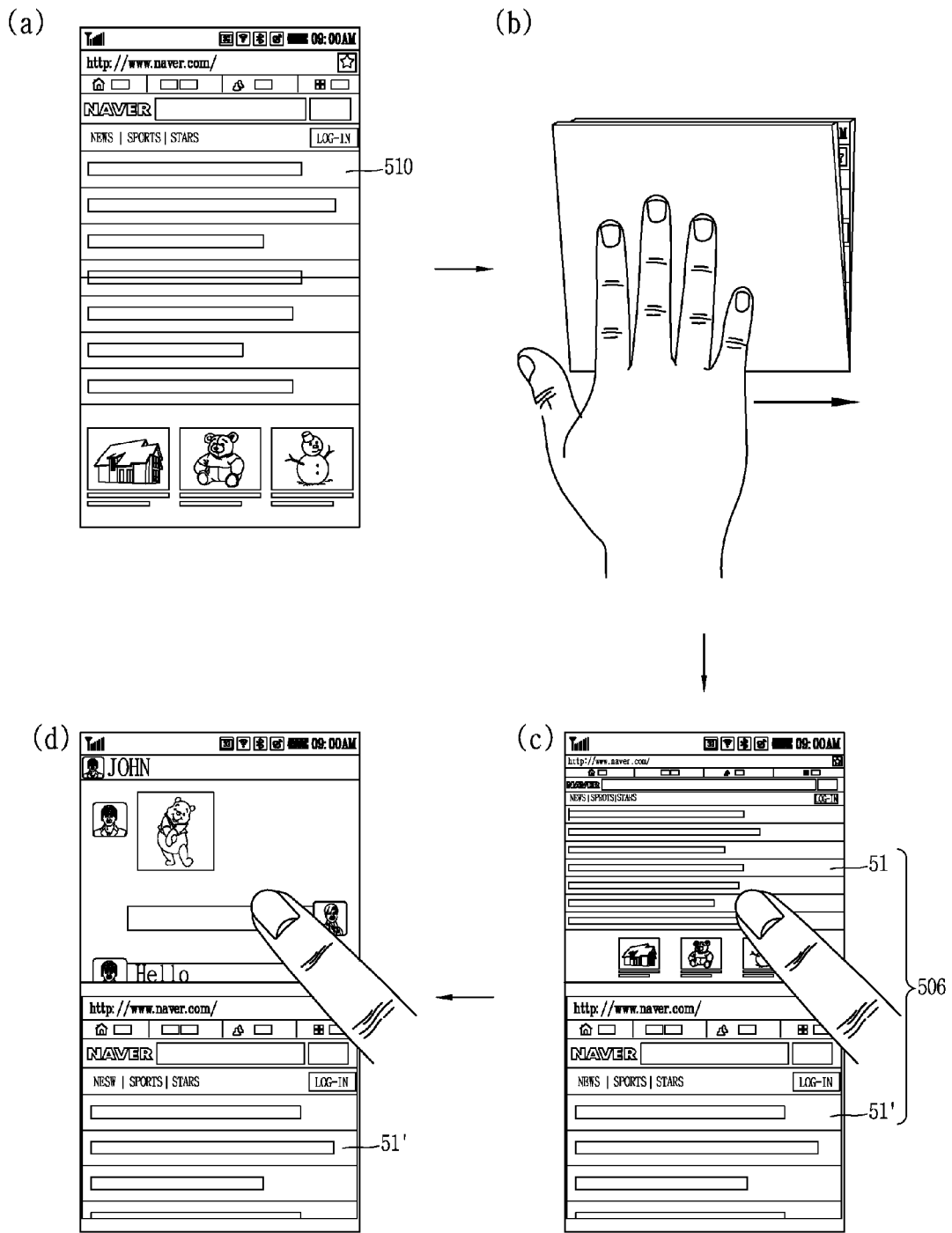

Referring to (c) and (d) of FIG. 5D, the controller 180 may control an application corresponding to the first content 51 or change the first content 51 into another visual information, in response to a touch input applied onto the first content 51.

This may allow the user to capture screen information by applying a touch input onto the folding edge area, and output a captured image of the screen information on a divided screen in the unfolded state.

Figure 6B:
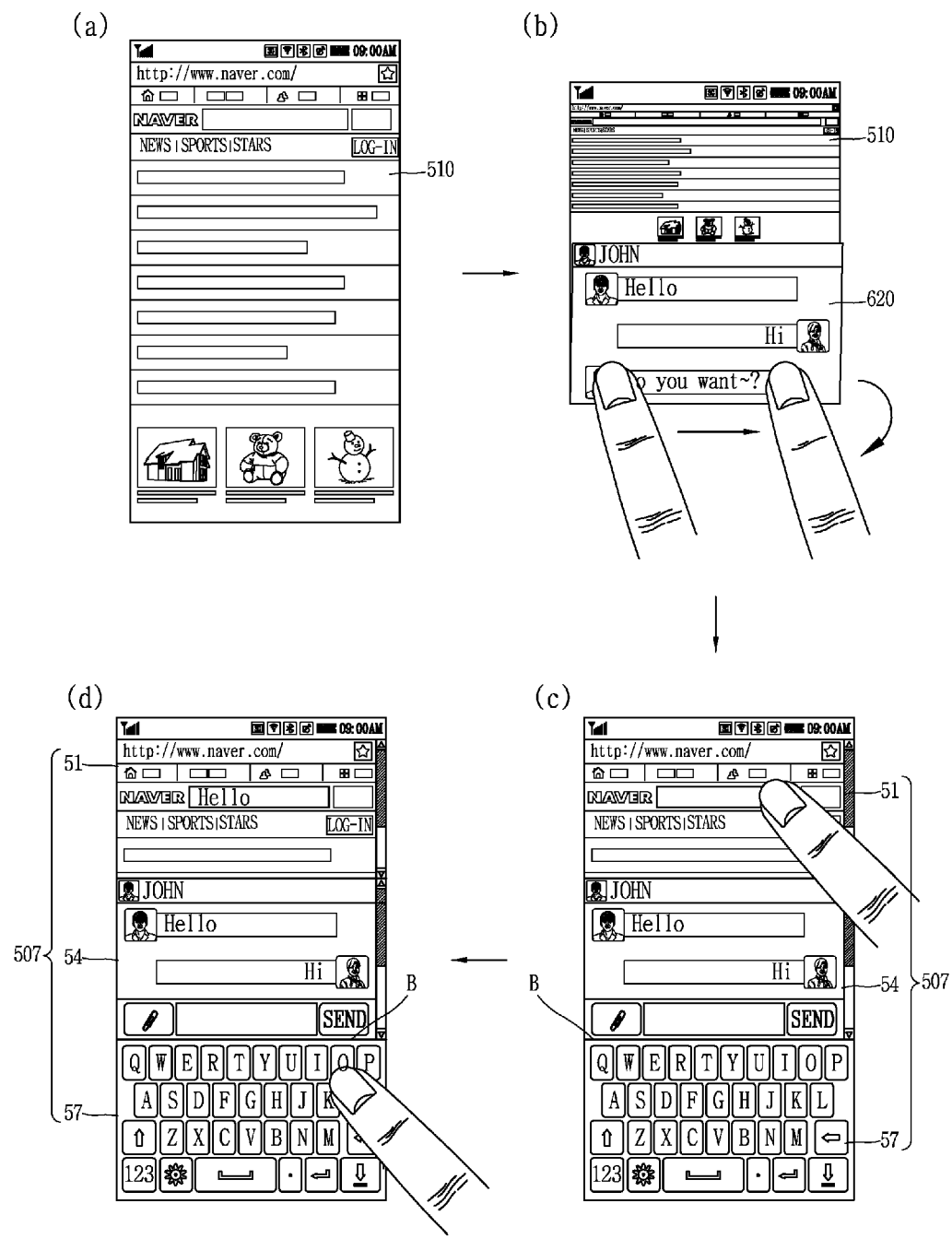
Figure 6C:
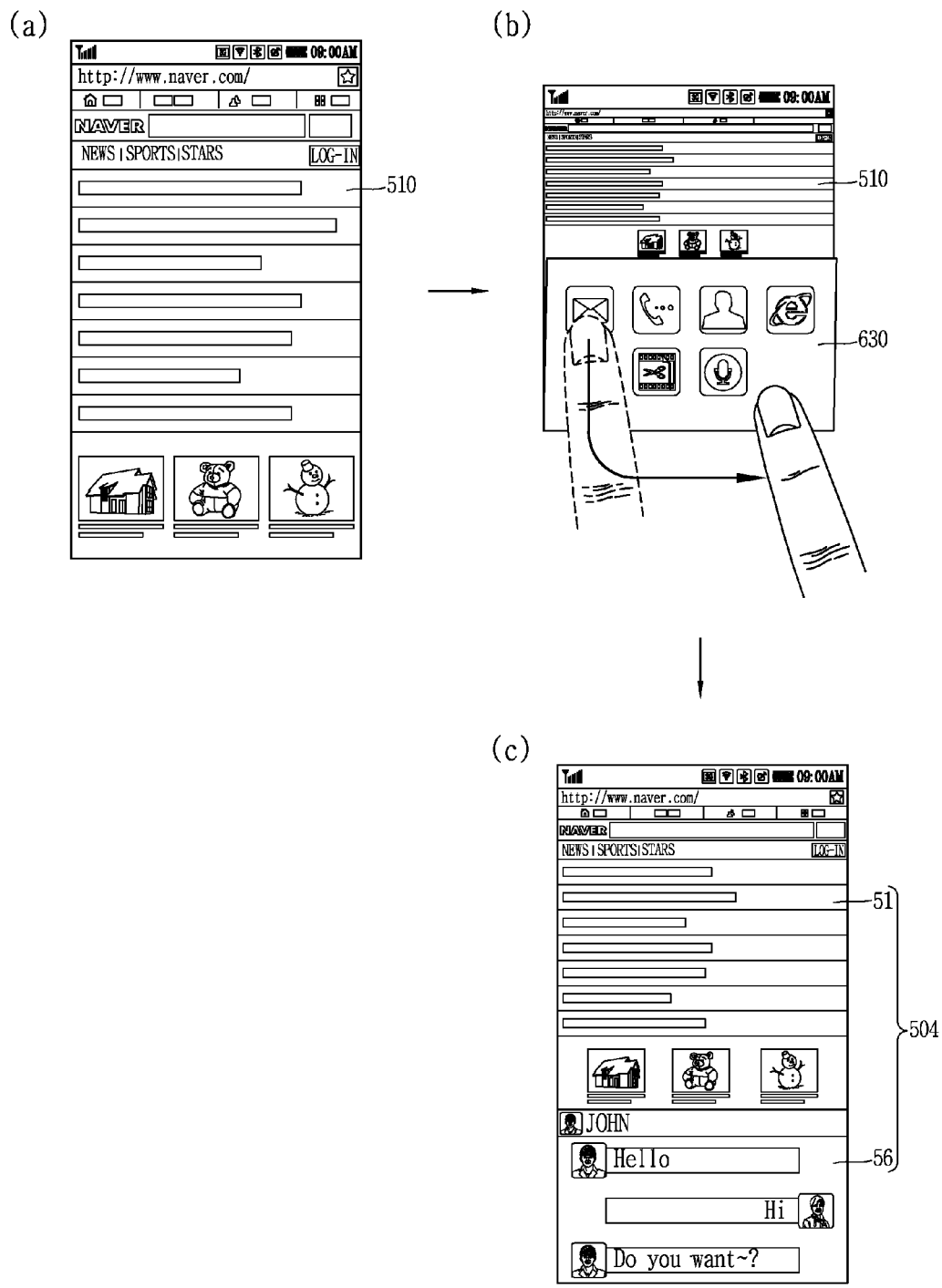

FIGS. 6A to 6C are conceptual views illustrating a control method of outputting divided screen information when a rear display unit is equipped.

Hereinafter, description will be given of a control method of outputting an image, which is output on a rear display unit, as a content on the display unit 151. The rear display unit according to this exemplary embodiment may include a touch sensor formed on at least one area thereof to sense a user's touch input.

In the unfolded state of the mobile terminal, the first screen information 510 may be displayed on the display unit 151. In the folded state, the first screen information 510 may be displayed on the display unit 151 and a second image 620 may be displayed on one area of the rear display unit which overlaps the front display unit 151. For example, the second image 620 may correspond to an execution screen of a specific application.

The controller 180 may control the display unit 151 to output the fourth divided screen information 504, in response to a touch input applied to one area of the rear display unit, which is defined as the folding edge area in the folded state.

The fourth divided screen information 504 may include the first content 51 including substantially the same information as the first screen information 510, and the sixth content 56 including substantially the same information as the second image 620. A boundary line B may be formed between the first and sixth contents 51 and 56. The boundary line B may be formed to correspond to the folding edge area. That is, the sixth content 61 may preferably be output on one area of the display unit 151, which faces one area of the rear display unit outputting the second image 620 thereon in the folded state.

Accordingly, when the user desires to output information, which is provided by the rear display unit in the folded state, on the display unit 151, the user may apply a touch input in the folded state to obtain divided screen information including desired information (the second image) and the previously-output information (the first screen information).

Hereinafter, description will be given of a control method of outputting divided screen information including contents associated with the first screen information and the second image. The display unit 151 may output the first screen information 510 in the unfolded state.

In the folded state, the first screen information 510 may be output on one area of the display unit 151, and the second image 620 may be output on one area of the rear display unit. When the touch input is applied to one area of the rear display unit defined as the folding edge area, the controller 180 may control the display unit 151 to output seventh divided screen information 507.

The seventh divided screen information 507 may include the first content 51, which is the same as the first screen information 510 output on the one area of the display unit 151, the fourth content 54 corresponding to the second image 620, and the seventh content 57 associated with the first and fourth contents 51 and 54. For example, the seventh content 57 may correspond to a virtual keyboard receiving a touch input for inputting text onto the first and fourth contents 51 and 54.

The fourth and seventh contents 54 and 57 may be displayed on the other area of the display unit 151, and the boundary line B between the fourth and seventh contents 54 and 57 may preferably be formed to correspond to the folding edge area.

After selecting one of the first and fourth contents 51 and 54, the controller 180 may control the display unit 151 to output text based on a touch input applied to the seventh content 57.

According to this embodiment, the user may output the contents, which are displayed on both of the display units, on the divided areas of the display unit 151, respectively, and obtain visual information associated with the contents without a separate control command.

Also, this may allow for preventing a problem that divided areas have to be changed if there is a need of a virtual keyboard for inputting text when two contents are output simultaneously.

Hereinafter, description will be given of a control method of outputting an execution screen of an application which is newly executed on a divided area, with reference to FIG. 6C. When the unfolded state is converted into the folded state while the first screen information 510 is output on the display unit 151, a third image 630 including at least one icon corresponding to an application may be output on one area of the rear display unit. The icon may correspond to an application designated by a user or a currently-executed application.

The controller 180 may control the display unit 151 to output the fourth divided screen information 504, in response to a touch input applied to the icon and the folding edge area. The fourth divided screen information 504 may include the first content 51 which is substantially the same as the first screen information 510, and the sixth content 56 corresponding to the icon to which the touch input was applied.

The sixth content 56 may correspond to an execution screen of an application corresponding to the touch input-applied icon. That is, the controller 180 may activate or execute the application based on the touch input, and output the execution screen on one divided area of the display unit 151.

Here, the touch input may correspond to, but not limited to, a continuous touch input, which is initially applied onto the icon and released on the folding edge area. Any touch input may be available if at least one icon is selected based on the touch input.

Although not illustrated in detail, when a plurality of icons are selected by the touch input, the controller 180 may control the display unit 151 to output an execution screen of each icon on the divided areas.

According to those exemplary embodiments, when a specific image is output on the rear display unit, divided screen information may be output on the display unit 151 using the specific image. This may enhance utilization of the mobile terminal having the display unit 151 which outputs information on both surfaces thereof.

Figure 7A:
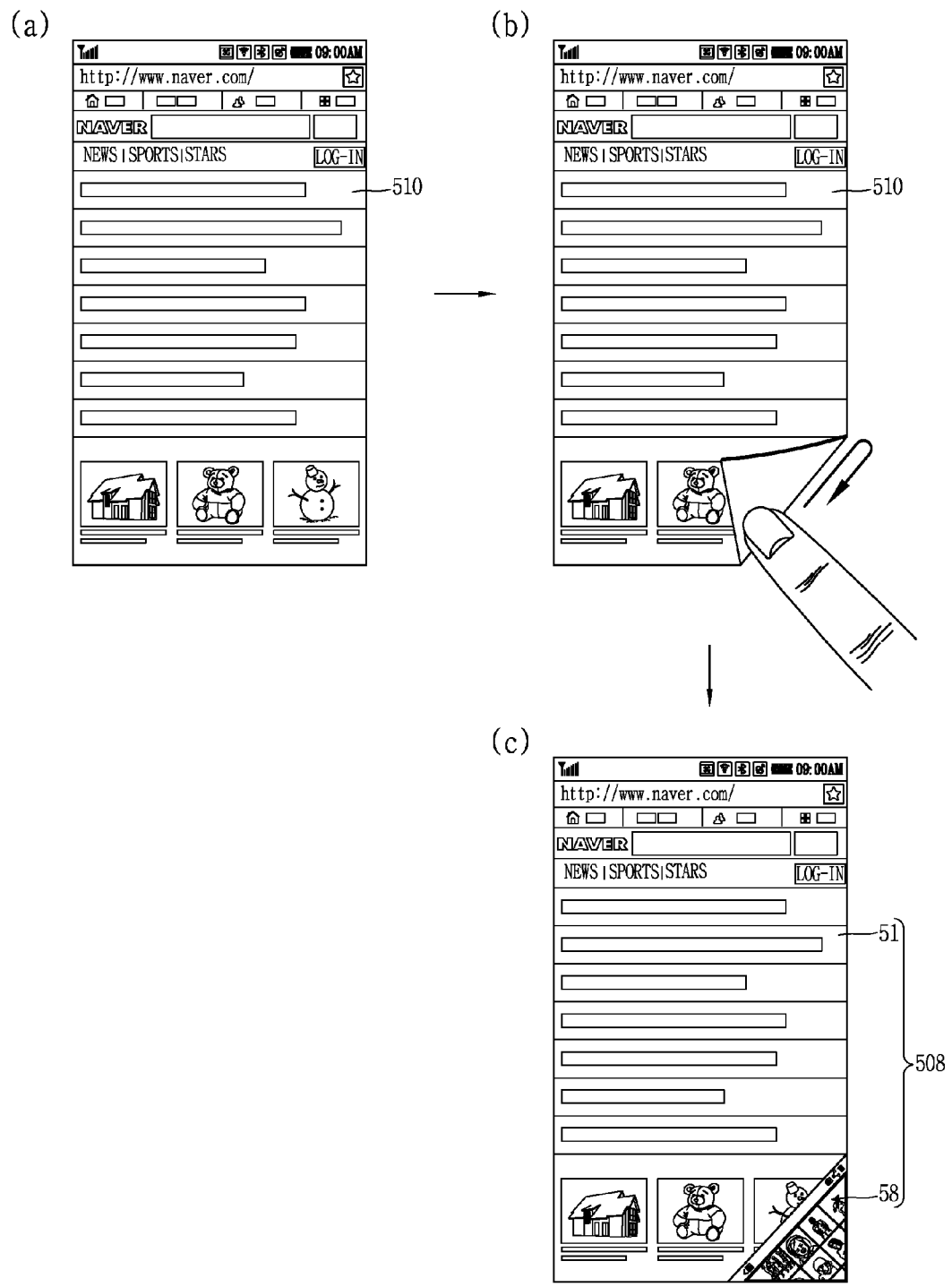

FIGS. 7A and 7B are conceptual views illustrating a method of outputting divided screen information when a random area of a mobile terminal is deformed due to an external force.

A mobile terminal according to this exemplary embodiment may not have a folding edge area and may be configured such that a random area can be folded into a particular shape by a user's external force. Accordingly, there may not be any limitation on length and position of the folding edge area and a number of the folding edge area.

Hereinafter, description will be given of an output method of divided screen information on a specific folding edge area, with reference to FIG. 7A. As illustrated in (a) of FIG. 7A, the first screen information 510 may be displayed on the display unit 151. Referring to (b) of FIG. 7A, one area including one edge area of the mobile terminal may be deformed by the external force to overlap the display unit 151, and accordingly, an area adjacent to the one edge area may be defined as a folding edge area.

The controller 180 may control the display unit 151 to output eighth divided screen information 508 in response to a touch input applied to the folding edge area. The eighth divided screen information 508 may include the first content 51 corresponding to the first screen information 510, and an eighth content 58.

As illustrated, the eighth content 58 may be displayed on the area adjacent to the one edge based on the folding edge area, and be output on one area (one divided area) of the display unit 151 having a triangular shape.

According to this exemplary embodiment, the user may define the folding edge area in a manner of deforming one area of the display unit 151 and apply a touch input to the folding edge area so as to for divided areas of various shapes. This may allow the user to adjust the shape of content included in the divided screen information.

Hereinafter, description will be given of a method of controlling a memory to remember first screen information based on a touch input applied to a folding edge area. The folding edge area deformed by an external force may be defined while the first screen information 510 is output. The controller 180 may control the memory 170 to store the first screen information 510, in response to a touch input applied to the folding edge area. Also, the controller 180 may control the display unit 151 to output ninth divided screen information 509 including the first content 51 and a ninth content 59.

The ninth content 59 may include a graphic image receiving a touch input for outputting the first screen information back onto the display unit 151. For instance, the ninth content 59 may be realized into a graphic image of a shape that a paper is folded. Although not illustrated in detail, the ninth content 59 may be output together with a description for the first screen information 510 or information related to a stored status.

While the ninth content 59 is output, the first content 51 may be deformed and output in response to a touch input applied to the first content 51. On the other hand, the controller 180 may control the display unit 151 to convert the ninth divided screen information 509 into the first screen information 510, in response to a touch input applied to the ninth content 59.

This may allow the user to store screen information desiring to remember in a manner of deforming the display unit 151 by applying an external force, which may result in providing an aesthetic sense as if folding a page to remember while reading a book.

Figure 8B:
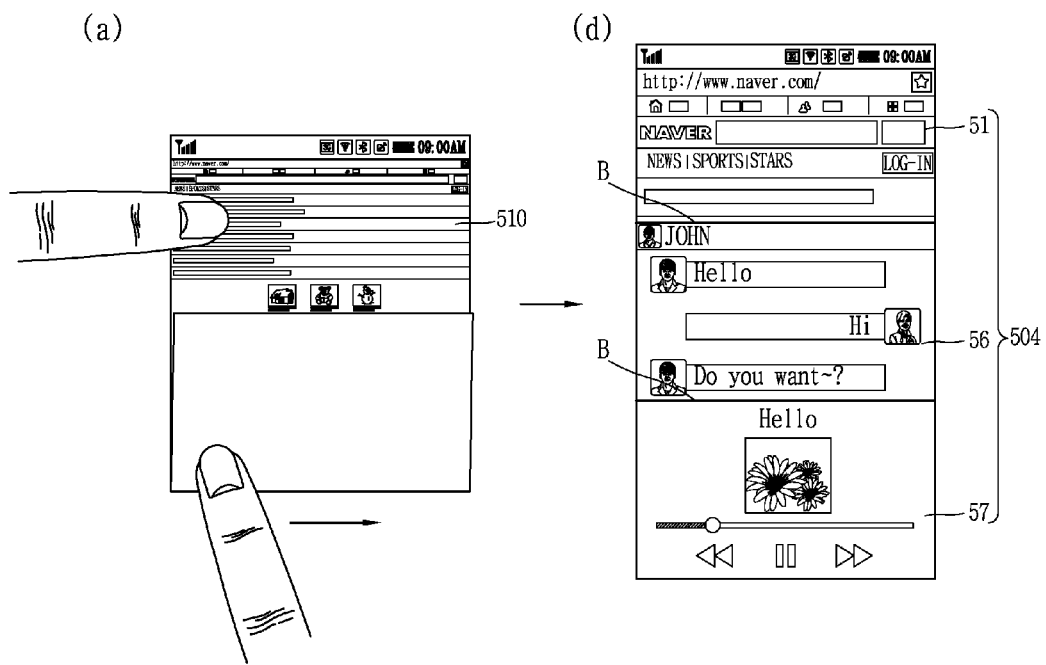
Figure 8C:
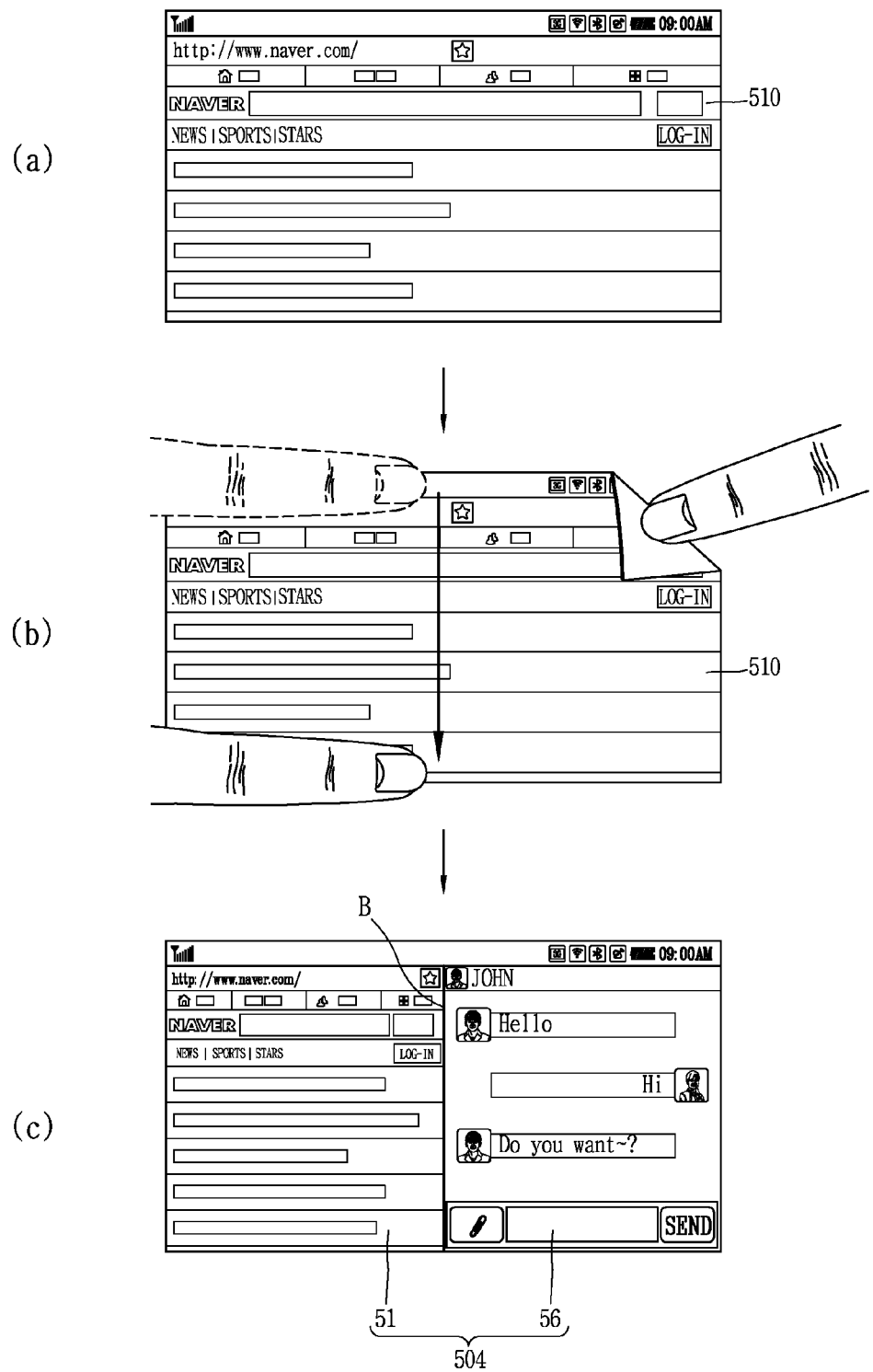

FIGS. 8A to 8C are conceptual views illustrating a control method of outputting divided screen information in response to an additional touch input.

Hereinafter, description will be given of a control method of outputting the ninth divided screen information 509, in response to a first additional touch input applied to the first screen information 510, with reference to FIG. 8A. As illustrated in (a) of FIG. 8A, the first additional touch input may correspond to a touch input which is continuously applied to one area of the first screen information 510 while a touch input is applied onto the folding edge area.

The controller 180 may control the memory 170 to store the first screen information 510, in response to the first additional touch input and the touch input applied to the folding edge area. The controller 180 may also output the first screen information 510 on the rear display unit The controller 180 may also control the display unit 151 to output the ninth divided screen information 509 including the first content 51 and the ninth content 59. Accordingly, the controller 180 may control the first content 51 while the ninth content 59 is output in response to the user's touch input.

Although not illustrated, when the touch input is applied to the folding edge area without the first additional touch input, the controller 180 may control the display unit 151 to output a content including another visual information, other than the ninth content 59, thereby restricting the function of storing the first screen information 510.

This may allow the user to recognize the state where the first screen information 510 is output on the rear display unit.

Hereinafter, description will be given of a control method of additionally forming a divided area, based on a second additional touch input, with reference to (b) of FIG. 2B and FIG. 8B. A mobile terminal according to this exemplary embodiment may be defined as a foldable mobile terminal having two guide lines 201'.

While a touch input is applied to a folding edge area corresponding to one guide portion 201', when a second additional touch input is applied to the display unit 151, the controller 180 may control the display unit 151 to output the fourth divided screen information 504.

The fourth divided screen information 504 may output the first content 51, the sixth content 56 and the seventh content 57 on three divided areas, respectively. The fourth divided screen information 504 may include boundary lines B corresponding to the two guide portions.

Although not illustrated, when a touch input is applied to the folding edge area without the second additional touch input, the controller 180 may control the display unit 151 to have two divided areas.

This may allow the user to form divided areas based on an additional touch input, in a mobile terminal having preset dividable areas.

Hereinafter, description will be given of a control method of outputting divided screen information including a boundary line B formed in response to a third additional touch input, with reference to FIG. 8C. The display unit 151 may output the first screen information 510.

When a third additional touch input is continuously applied to the display unit 151 while a touch input is applied to the folding edge area, the controller 180 may form a boundary line B corresponding to a touch path of the third additional touch input. The third additional touch input may correspond to a continuous touch input exceeding a preset range on the display unit 151 or a touch input which connects two edges of the display unit 151.

The controller 180 may control the display unit 151 to output the fourth divided screen information 504. The fourth divided screen information 504 may include the first content 51 and the sixth content 56, and the boundary line B between the first and sixth contents 51 and 56 may correspond to the third additional touch input.

This may allow the user to more easily set the divided areas by the third additional touch input.

Figure 9A:
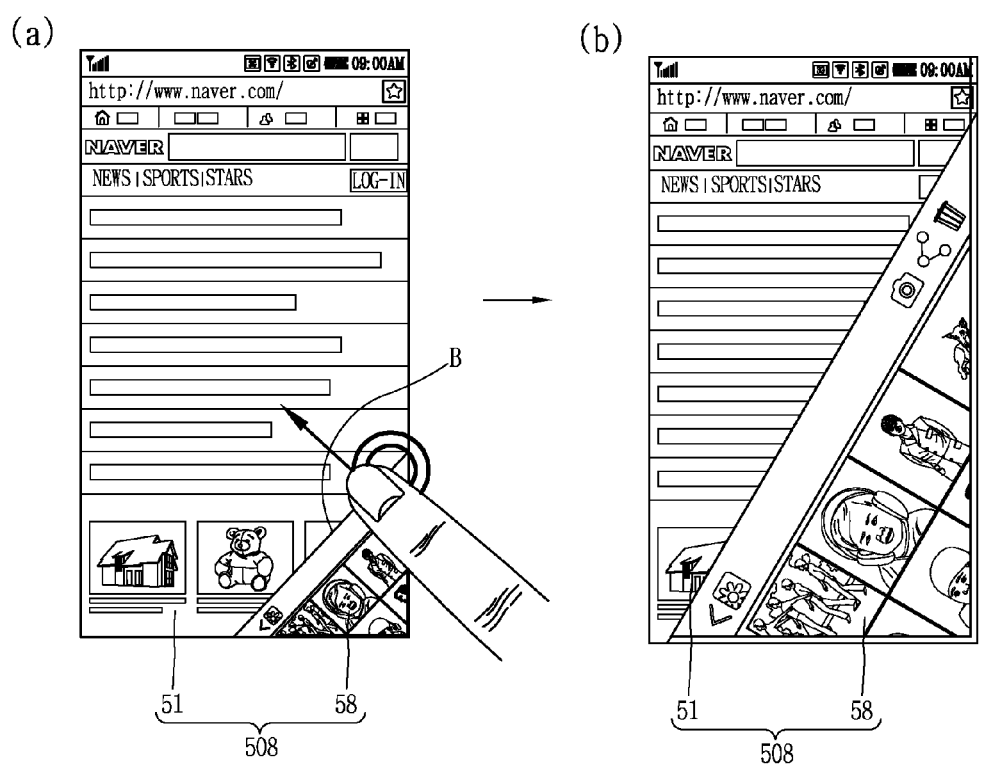
FIGS. 9A to 9C are conceptual views illustrating a control method of changing divided screen information.
Figure 9B:
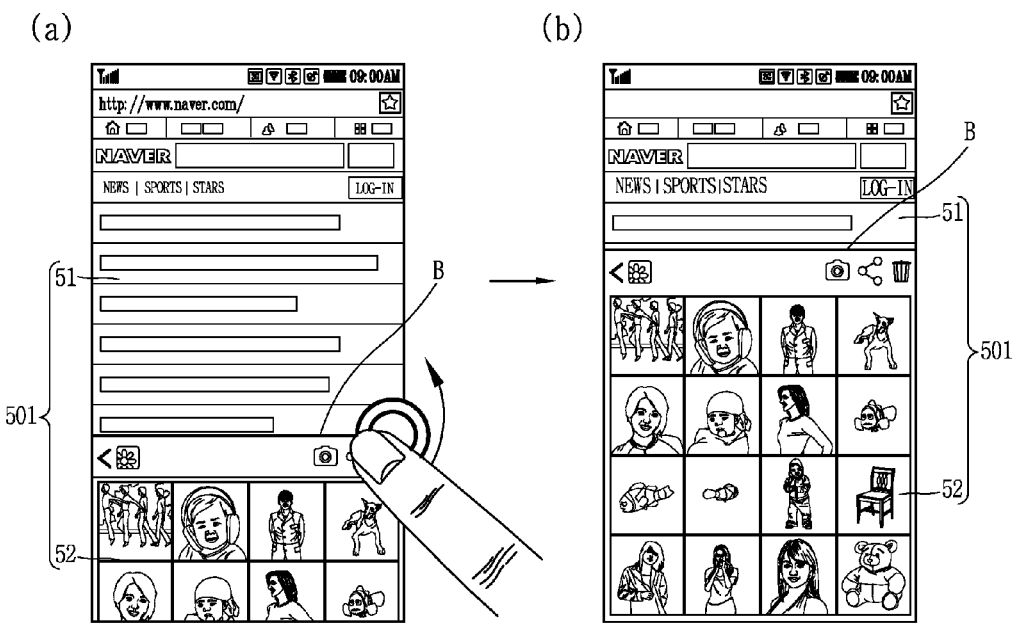
Figure 9C:
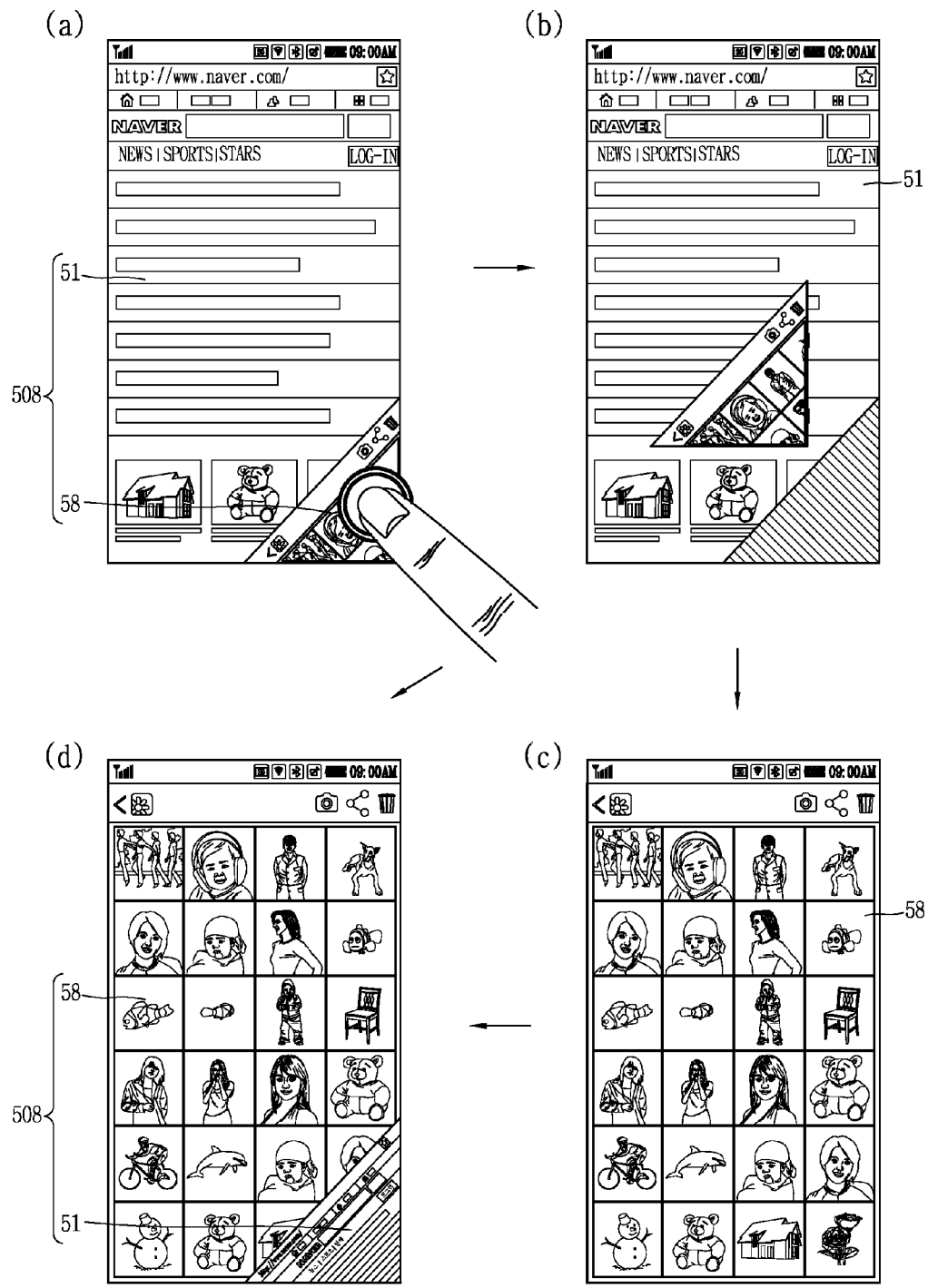

FIGS. 9A to 9C are conceptual views illustrating a control method of changing divided screen information.

Hereinafter, description will be given of a control method of changing the divided areas in response to a touch input applied to a boundary line, with reference to FIG. 9A. (a) of FIG. 9A is a conceptual view illustrating the display unit 151 outputting the eighth divided screen information 508 including the first and eighth contents 51 and 58. Any deformation area may not be defined in the mobile terminal according to this exemplary embodiment.

The controller 180 may control the display unit 151 to change a position of the boundary line B in response to a touch input applied to the boundary line B. Also, the controller 180 may control the display unit 151 to change output areas and output types of the first and eighth contents 51 and 58, in response to the position change of the boundary line B.

For example, the touch input may correspond to a long touch input applied to the boundary line B for a preset time and a dragging touch input which is continuously applied. The dragging touch input may be applied along a direction intersecting with an extending direction of the boundary line B.

When the touch input is moved to one area of the display unit 151 on which the first content 51 is output, the controller 180 may control the display unit 151 to reduce the divided area outputting the first content 51 and extend the divided area outputting the eighth content 58.

Hereinafter, description will be given of a control method of changing divided areas in a foldable mobile terminal having a preset deformation area, with reference to FIG. 9B. As illustrated in (a) of FIG. 9B, the display unit 151 may output the first divided screen information 501 including the first and second contents 51 and 52. The first divided screen information 501 may include a boundary line B which corresponds to one of the two guide portion 201'.

The controller 180 may control the display unit 151 such that the boundary line B is moved to a position corresponding to another guide portion 201', in response to a continuous touch input applied to the boundary line B. That is, the controller 180 may control the display unit 151 to reduce the divided area outputting the first content 51 and extend the divided area outputting the second content 52.

The touch input may correspond to a long touch input and a flicking touch input.

This may allow the user to change the initially-formed divided areas, in a manner of applying the touch input to the boundary line B.

Hereinafter, description will be given of a control method of changing divided areas on the display unit 151 outputting contents, with reference to FIG. 9C. As illustrated in (a) of FIG. 9C, one area of the display unit 151 outputting the first content 51 may be defined as a first divided area, and the other area outputting the eighth content 58 may be defined as a second divided area.

As illustrated in (b) and (d) of FIG. 9C, the controller 180 may control the display unit 151 to output the first content 51 on the second divided area and the eighth content 58 on the first divided area, in response to a touch input applied to the eighth content 58. The controller 180 may control the display unit 151 to move the output position of the first content 51 to correspond to the touch input, such that the eighth content 58 can be output on the divided area where the touch input is released.

Referring to (b) and (c) of FIG. 9C, the controller 180 may control the eighth content 58, on which the initial touch input was received, to be output on the entire display unit 151. Accordingly, the display unit 151 may convert the divided screen information into new screen information.

According to this exemplary embodiment, the user can selectively convert a content output on a pre-divided area in response to a touch input applied to a folding edge area or the like. This may allow the user to output a specific content on a desired position of the display unit 151.

Also, the user may also be able to release the division of the display unit 151 based on the touch input and output desired screen information.

FIGS. 10A to 10E are conceptual views illustrating a control method of releasing a division of a display unit 151.

As illustrated in FIG. 10A, the eighth divided screen information 508 may include a boundary line B by which the first content 51 and the eight content 58 are divided. The controller 180 may release the division of the display unit 151, in response to a continuous touch input applied along the boundary line B.

That is, the controller 180 may control the display unit 151 to convert the eighth divided screen information 508 into the first screen information 510. When the division is released, the controller 180 may output the first screen information 510 which was output when the division was carried out, but the present disclosure may not be limited to this.

For example, the controller 180 may control one of the first and eighth contents 51 and 58 to be output on the entire display unit 151, or control the display unit 151 to output a preset specific image (a home screen page, a lock screen, etc.).

Hereinafter, description will be given of a release of the division based on a touch input applied to a boundary line B according to another exemplary embodiment, with reference to FIGS. 9A and 10B. The controller 180 may control the display unit 151 to adjust an output range of the content based on a continuous touch input applied in a direction intersecting with the extending direction of the boundary line B.

When a size of the eighth content 58 is reduced smaller than a preset reference size in response to a touch input applied to the boundary line B, the controller 180 may control the display unit 151 to release the division and output the first screen information 510.

Or, when the continuous touch input starting from the boundary line B reaches one edge of the display unit 151, the controller 180 may control the display unit 151 to release the division.

Figure 10C:
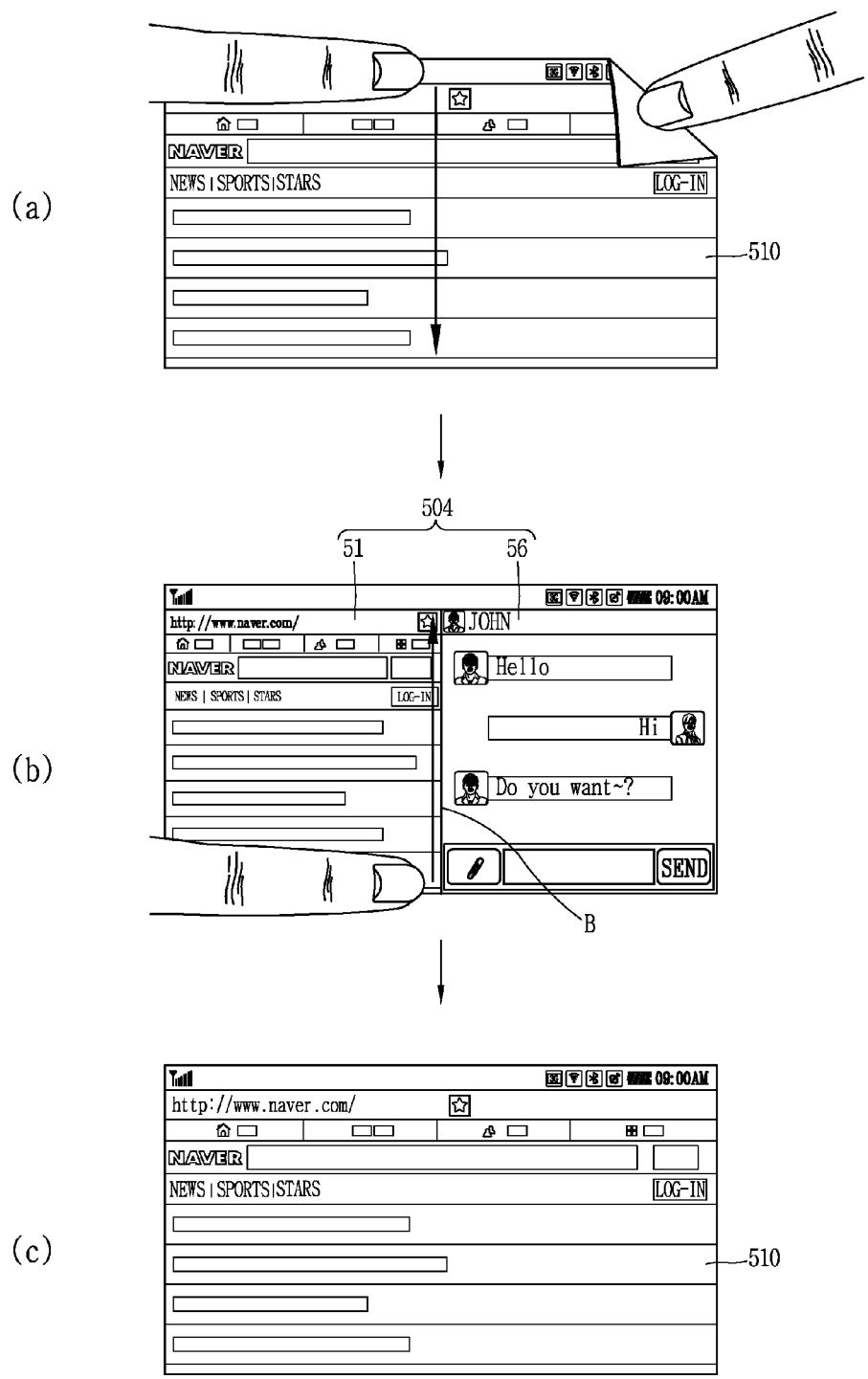

Referring to FIG. 10C, the controller 180 may control the display unit 151 to output the fourth divided screen information 504, in response to a touch input applied to the folding edge area and a continuous touch input applied to the display unit 151. The continuous touch input may be formed along one direction, and the boundary line B may be formed to correspond to the touch input.

When the continuous touch input is applied in an opposite direction to the one direction along the boundary line B, the controller 180 may control the display unit to release the division and output the first screen information 510.

Or, the controller 180 may control the display unit 151 such that the division is released only when the continuous touch input applied in the opposite direction is applied together with the touch input applied to the folding edge area, which is formed as the mobile terminal is converted back into the folded state.

Referring to FIG. 10D, in the unfolded state, the display unit 151 may output the eighth divided screen information 508 including the first and eighth contents 51 and 58. The eighth divided screen information 508 may include the boundary line B.

The controller 180 may control the display unit 151 such that the division thereof is released when the mobile terminal is deformed into the folded state to form the folding edge area corresponding to the boundary line B and then converted back into the unfolded state.

Although not illustrated, when the mobile terminal includes the rear display unit, the controller 180 may control the rear display unit to output an image corresponding to the boundary line B.

When the mobile terminal is back into the unfolded state, the controller 180 may control the display unit 151 to output the first screen information 510.

Figure 10E:
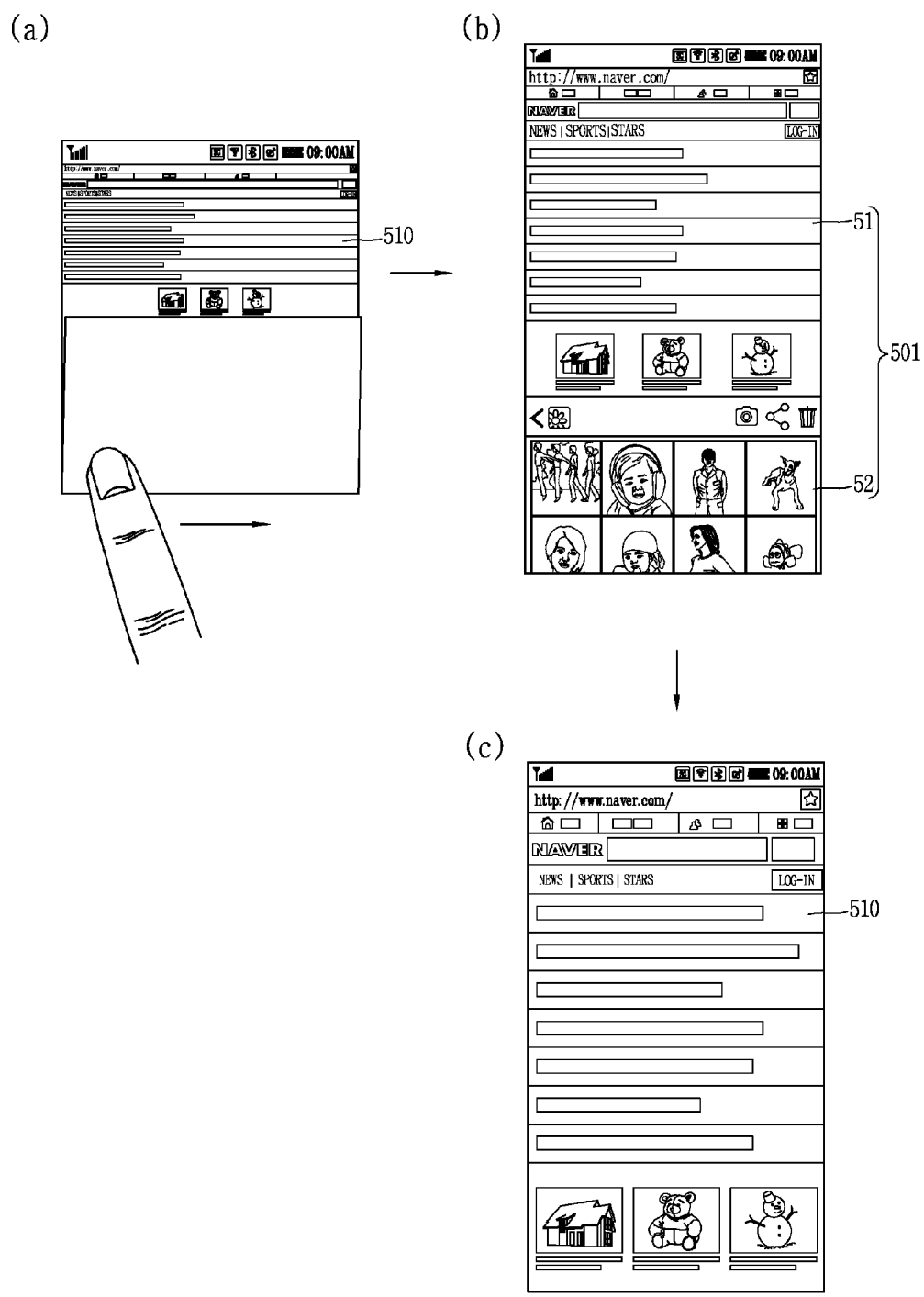

Referring to FIG. 10E, the controller 180 may control the display unit 151 to output the first divided screen information 501 including the first and second contents 51 and 52, in response to a touch input applied to the folding edge area.

When a preset time elapses without any control command applied after the first divided screen information 501 is output, the controller 180 may release the division of the display unit 151. That is, when any touch input is not sensed for a preset time, the controller 180 may control the display unit to output the first screen information 510 again.

The configurations and methods of the mobile terminal or image display device in the aforesaid embodiments may not be limitedly applied, but such embodiments may be configured by a selective combination of all or part of the embodiments so as to implement many variations.

What is claimed is:

1. A mobile terminal comprising:
a terminal body configured to be bendable by an external force;
a display unit configured to display screen information on a screen in an unfolded state;
a sensor configured to sense a bending of the terminal body from a folded state to the unfolded state of the display unit by the external force and configured to sense a touch input applied along a folding edge area defined by a bending of the display unit; and
a controller configured to:
control the display unit to display the screen information on the screen regardless of the sensed bending from the folded state to the unfolded state by the external force, if the touch input is not detected, and
display the screen information on a first screen in response to the bending from the folded state to the unfolded state by the external force, if the touch input applied along the folding edge area is detected in the folded state,
wherein the first screen is one of a plurality of screens, and the plurality of screens are generated by dividing the screen based on the touch input applied along the folding edge area in the folded state.

2. The mobile terminal of claim 1, wherein the folding edge area comprises a folded edge forming a part of an edge of the deformed terminal body in the folded state, and a surrounding area extending from the folding edge within a preset range.

3. The mobile terminal of claim 2, wherein the controller controls the display unit to output a plurality of contents on the plurality of screens, respectively.

4. The mobile terminal of claim 3, wherein the controller defines a boundary line distinguishing the plurality of screens,
wherein first and second contents of the plurality of contents are respectively displayed on the plurality of screens, and
wherein the boundary line corresponds to the folding edge area.

5. The mobile terminal of claim 4, wherein the controller forms the boundary line on a different area of the display unit, corresponding to a touch range of a different touch input sensed by the touch sensor.

6. The mobile terminal of claim 5, wherein the controller decides a number of the contents included in the divided screen information, based on a length of a continuous touch input applied to the folding edge area.

7. The mobile terminal of claim 5, wherein the deformation sensor decides a number of the contents included in the divided screen information, based on a pressure degree of the touch input applied to the folding edge area.

8. The mobile terminal of claim 4, wherein the controller changes one screen of the plurality of screens on which one of the plurality of contents is displayed, based on the touch input applied to the boundary line.

9. The mobile terminal of claim 8, wherein the controller controls the display unit to convert the plurality of contents into the screen information, when the touch input is a continuous touch applied along an extending direction of the boundary line.

10. The mobile terminal of claim 4, wherein after the unfolded state is converted into the folded state to define the folding edge area corresponding to the boundary line, when the conversion from the folded state back into the unfolded state is sensed by the sensor, the controller controls the display unit to display the screen information on the screen.

11. The mobile terminal of claim 2, wherein the terminal body comprises first and second guide portions configured to guide the deformation of the terminal body, and the folding edge area corresponds to at least one of the first and second guide portions.

12. The mobile terminal of claim 11, wherein in the folded state where one folding edge area corresponding to the first guide portion is formed, the controller forms a plurality of portions of the display unit, based on a length of the touch input applied to the folding edge area, and wherein two individual contents or three individual contents are displayed based on the plurality of portions of the display unit based on the length.

13. The mobile terminal of claim 1, wherein the terminal body comprises a front surface having the display unit and a rear surface corresponding to the front surface, wherein the terminal body further comprises a rear display unit formed on the rear surface and configured to output visual information, and wherein one area of the rear display unit is defined as the folding edge area in the folded state.

14. The mobile terminal of claim 13, wherein a folding area of the rear display unit is used to output a preset first image in the folded state, and wherein the controller outputs the first image as a part of the divided screen information when the folded state is changed into the unfolded state after a touch input is applied to the folding edge area.

15. The mobile terminal of claim 13, wherein when a second image including at least one icon corresponding to an application is output on a folding area of the rear display unit in the folded state, the controller controls the display unit to output an execution screen of the application as a part of the divided screen information, in response to a touch input which is initially applied to the icon and continuously applied to the folding edge area.

16. The mobile terminal of claim 3, wherein the controller decides a number of the content to be included in the divided screen information based on an additional touch input applied to the display unit while the touch input applied to the folding edge area is sensed.

17. The mobile terminal of claim 16, wherein the controller controls a memory to store the screen information, in response to the additional touch input.

18. The mobile terminal of claim 3, wherein the plurality of contents include a preset image, a content corresponding to an execution screen of a specific application, and a basic content corresponding to the screen information.

19. A method for controlling a mobile terminal comprising a terminal body and a display unit both bendable by an external force, the method comprising:

outputting screen information on a screen of the display unit;

sensing a bending between a folded state and an unfolded state of the terminal body;

displaying the screen information on the screen regardless of the sensed bending from the folded state to the unfolded state by the external force, if a touch input is not detected; and displaying the screen information on a first screen in response to the bending from the folded state to the unfolded state by the external force, if the touch input applied along a folding edge area defined by the bending of the display unit is detected in the folded state, wherein the first screen is one of a plurality of screens, and the plurality of screens are divided by the folding edge area along which the touch input is applied.

20. The method of claim 19, wherein a plurality of contents independent of each other are displayed on the plurality of screens.

21. The method of claim 20, wherein the terminal body further comprises a guide portion configured to guide the terminal body to bend by the external force, and wherein a boundary line between the plurality of contents corresponds to the guide portion.

22. The method of claim 20, further comprising:

outputting the screen information, in response to a touch input applied to the boundary line between the plurality of contents.

* * * * *